US008392421B1

(12) United States Patent　　(10) Patent No.:　　US 8,392,421 B1
Nucci et al.　　(45) Date of Patent:　　*Mar. 5, 2013

(54) SYSTEM AND METHOD FOR INTERNET ENDPOINT PROFILING

(75) Inventors: Antonio Nucci, San Jose, CA (US); Supranamaya Ranjan, Albany, CA (US); Aleksandar Kuzmanovic, Evanston, IL (US)

(73) Assignee: Narus, Inc., Sunnyvale, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/072,173

(22) Filed: Mar. 25, 2011

Related U.S. Application Data

(63) Continuation-in-part of application No. 12/104,723, filed on Apr. 17, 2008, now Pat. No. 8,019,764.

(51) Int. Cl.
　*G06F 7/00*　(2006.01)
　*G06F 17/30*　(2006.01)
(52) U.S. Cl. ........ 707/739; 707/741; 707/748; 707/752; 707/755
(58) Field of Classification Search ........................ None
See application file for complete search history.

(56) References Cited

U.S. PATENT DOCUMENTS

| | | | |
|---|---|---|---|
| 6,721,269 B2 * | 4/2004 | Cao et al. ...................... | 370/227 |
| 7,801,896 B2 * | 9/2010 | Szabo ........................... | 707/739 |
| 2007/0061266 A1 * | 3/2007 | Moore et al. .................. | 705/51 |

OTHER PUBLICATIONS

Louis Plissonneau, Jean-Laurent Costeux, & Patrick Brown, "Analysis of Peer-to-Peer Traffic on ADSL" Pam2005, LNCS 3431, pp. 69-82, 2005.
Anthony McGregor, Mark Hall, Perry Lorier & James Brunskill, "Flow Clustering Using Machine Learning Techniques".
Andrew Moore & Konstantina Papagiannaki, "Toward the Accurate Identification of Network Applications".
Peter Cheeseman & John Stutz, "Bayesian Classification (Autoclass): Theory and Results".
Laurent Bernaille, Renata Teixeria & Kave Salamantian "Early Application Identification".
Google Webmaster Help Center: Google 101: How Google Crawls, indexes and Serves the web.
Alan Mislove, Massimiliano Marcon, Peter Druschel, Bobby Bhattacharjee, & Krishna Gummadi "Measurement and Analysis of Online Social Networks".
Jeffrey Erman, Martin Arlitt & Anirban Mahanti, "Traffic Classification Using Clustering Algorithms".
M. Patrick Collins, Tomothy Shimeall, Sidney Faber, Jeff Janies, Rhiannon Weaver, Markus Shon "Using Uncleanliness to Predict Future Botnet Addresses".
Matthew Roughan, Subhabrata Sen, Oliver Spatscheck, Nick Duffield "Class-of-Service Mapping for QoS: A Statistical Signature-based approach to IP Traffic Classification".
Harsha Madhyastha, Tomas Isdal, Michael Piatek, Colin Dixon, Thomas Anderson, Arvind Krishnamurthy, Arun Venkataramani "iPlane: An Information Plane for Distributed Services".
Patrick Haffner, Subhabrata Sen, Oliver Spatscheck, Dongmei Wang "ACAS: Automated Construction of Application Signatures".
Thomas Karagiannis, Konstantina Papagiannaki, Nina Taft & Michalis Faloutsos "Profiling the End Host".

(Continued)

*Primary Examiner* — Jau-Shya Meng
(74) *Attorney, Agent, or Firm* — Fernandez & Associates, LLP

(57) ABSTRACT

The present invention relates to a method of profiling an Internet endpoint associated with an Internet Protocol (IP) address, an IP prefix, or a domain name, the method includes generating a profiling rule using an Internet search engine, obtaining a search result by inputting the IP address, the IP prefix, or the domain name to the Internet search engine, and classifying the Internet endpoint based on the search result using the profiling rule.

24 Claims, 20 Drawing Sheets

OTHER PUBLICATIONS

Subhabrata Sen, Oliver Spatscheck, Dongmei Wang "Accurate, Scalable In-Network Identification of P2P Traffic Using Application Signatures".

Patrick Verkaik, Oliver Spatscheck, Jacobus Van Der Merwe & Alex C. Snoeren, "Primed: Community-of-interest-based DDOS mitigation" AT&T Lab Research, UC San Diego.

Yinglian, Xie, Fang Yu, Kannan Achan, Eliot Gillum, Moises Goldszmidt, & Ted Wobber, "How Dynamic are IP Addresses?" Microsoft Resarch, Silicon Valley.

Jian Liang, Rakesh Kumar, Yongjian Xi, & Keith Ross, "Pollution in P2P File Sharing Systems".

Thomas Karagiannis, Konstantina Papagiannaki & Michalis Faloutsos, "BLINC: Multilevel Traffic Classification in the Dark".

Thomas Karagiannis, Andre Broido, Nevil Brownlee, KC Claffy, & Michalis Faloutsos, "Is P2P Dying or Just Hiding?".

Jianning Mai, Chen-Nee-Chuah, Ashwin Sridharan, Tao Ye, Hui Zang,"Is Sampled Data Sufficient for Anomally Detection?".

Patrick McDaniel, Subhabrata Sen, Oliver Sptascheck, Jacobus Van Der Merwe, Bill Aiello, Charles Kalmanek, "Enterprise Security: A Community of Interest Based Approach".

Andrew Moore& Denis Zuev, "Internet Traffic Classification Using Bayesian Analysis Techniques".

"Unconstrained Endpoint Profiling (Googling the Internet)" Sigcomm 2008 Submission #103, 14 Pages.

* cited by examiner

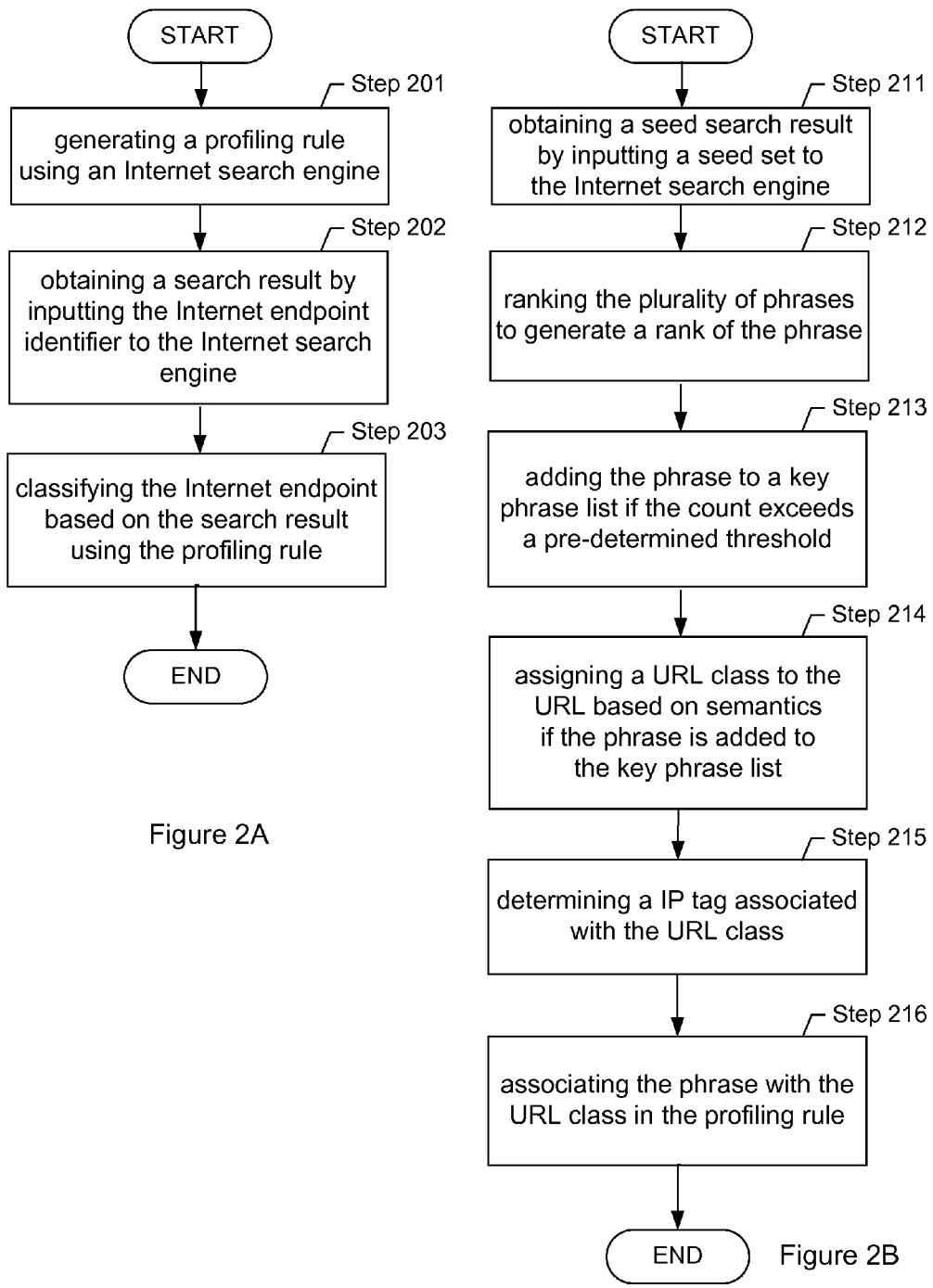

CoolWhois.com - WHOIS search of sleazydream.com
IP Addresses: 207.246.152.23 (test-rme-temp1), 216.127.55.45 (test-for-block) Whois results from whois.dotster.com: The information in this whois database ...
www.coolwhois.com/d/sleazydream.com - 8k - Cached - Similar pages - Note this "No.","URL","Rating","IP Address","Update Date" 17793,"satradio9 ...
... 13949,"www.sleazyeaze.com",6,"212.227.34.3",31/01/07 13948,"www.sleazydream.com",6,"216.127.55.45",31/01/07 13947,"www.sky-dream.com",6,"124.33.71.220" ...
facthai.files.wordpress.com/2007/08/mict-blocklist-28-05-07csv.txt - 601k -
Cached - Similar pages - Note this

Figure 3F

DNS Server List - Name Server List
69.111.95.106 206.196.151.153 69.111.95.107. Shaw Cable 64.59.144.16 64.59.144.17 ...
69.111.95.106 206.196.151.153. Tiscali Replacemet for Browser errors ...
www.dnsserverlist.org/ - 25k - Cached - Similar pages - Note this DNS Server List - Public DNS Server List Name Server List - Public ...
69.111.95.106 206.196.151.153. Earthlink - seem to be shared by Cable and DSL ...
69.111.95.106 206.196.151.153. ORSC Public Access DNS Nameservers (Anyone ...
www.waltechnet.com/dnsserverlist_site/dnsserverlist.htm - 21k -
Cached - Similar pages - Note this 209.40.202.107 Web Search - Who.is
DNS Server List 69.111.95.106 206.196.151.153 69.111.95.107...202.75.44.18
203.106.3.171 202.75.44.20 69.111.95.106 206.196.151.153 69.111.95.107. ...
www.whois.ws/websearch.php?current_name=209.40.202.107 - 21k -
Cached - Similar pages - Note this 216.55.97.168 Web Search - Who.is
NTL (Cable) and Virgin.net (ADSL) 194.168.4.100 194.168.8.100 69.111.95.106
206.196.151.153...199.166.28.10 199.166.29.3 199.166.31.3 195.117.6.25 ...
www.whois.ws/websearch.php?current_name=216.55.97.168 - 23k -
Cached - Similar pages - Note this
More results from www.whois.ws »

Forum @ Linux.Or.Id • View topic - Squid Performance
203.130.196.155 3874 2573 203.130.196.5 1298 1004 208.67.222.222 298 50
203.130.208.18 248 244 208.67.220.220 4 3 202.134.1.10 1 0 69.111.95.106 1 0 ...
forum.linux.or.id/viewtopic.php?f=16&p=95193 - 74k - Cached - Similar pages - Note this msn problem + error signature - Tech Support Guy Forums
{53E96D8F-F817-45B3-9898-FFFE290AEAA1}; NameServer = 69.111.95.106
206.196.151.153 023 - Service: Google Updater Service (gusvc) - Google - C:\Program ...
forums.techguy.org/windows-nt-2000-xp/606244-msn-problem-error-signature.html - 42k -
Cached - Similar pages - Note this

Figure 3G

Google  201.229.208.2                                      [Search]  Advanced Search
                                                                     Preferences

Web

User talk:201.229.208.2 - OrbiterWiki
User talk:201.229.208.2. Category: temp-ban ... Retrieved from
"http://www.orbiterwiki.org/wiki/User_talk:201.229.208.2". Category: temp-ban ...
www.orbiterwiki.org/wiki/User_talk:201.229.208.2 - 10k - Cached - Similar pages - Note this User talk:201.229.208.2 - Wikipedia, the free encyclopedia
This IP address, 201.229.208.2, is registered to Compaa Dominicana de Telfonos,
Dominican Republic, and may be shared by multiple users. ...
en.wikipedia.org/wiki/User_talk:201.229.208.2 - 32k - Cached - Similar pages - Note this MonkeyWiki: Blocked Spam
201.229.208.2 Sat Feb 2 20:34:06 2008 linksleeve <a href= h... 193.95.84.205 Sat Feb 2 ...
201.229.208.2 Sun Feb 3 17:13:26 2008 linksleeve <a href= h. ...
www.waywood.co.uk/MonkeyWiki/BlockedSpam.html - 86k -
Cached - Similar pages - Note this o\" Diary..jeab \"o ...Jeab~ jc ~ c - gam รักล
<a href= ></a>. 12:18 - 01/03/2551 ip : 201.229.208.2. name : Spaiva-hi age : Unknown
mail ... <a href= ></a>. 11:35 - 01/03/2551 ip : 201.229.208.2 ...
jc23.diary.postjung.com/ - 44k - Cached - Similar pages - Note this FREE PROXY LIST - Protect Your Online Privacy!
WHOIS Lookup result of 201.229.208.2. % Joint Whois - whois.lacnic.net % This server
accepts single ASN, IPv4 or IPv6 queries % Copyright LACNIC lacnic.net ...
goodbyefirewall.cn/index.php?act=whois&ip=201.229.208.2 - 7k -
Cached - Similar pages - Note this ProxyHut - Free Proxy List - New Proxies - Freshest Proxies on the Web
02-29-2008 10:03:06, 0.37 Seconds, 201.229.208.2, 80, Dominican Republic, 02-18-2008
20:43:42. 02-29-2008 10:03:10, 0.61 Seconds, 195.229.236.106 ...
www.proxyhut.org/index.php?sort=verified - 54k - Cached - Similar pages - Note this

Figure 3H

Google  195.242.214.33                                     [Search]  Advanced Search
                                                                     Preferences

Web

284586,195.242.214.33,1,0 214730,61.230.110.159,1,0 135164,194.31 ...
284586,195.242.214.33,1,0 214730,61.230.110.159,1,0 135164,194.31 205.2,1,0
317296,195.3.78.174,1,0 70233,69.20.9.103,1,0 332800,210.236.176.5,1,0 196002 ...
www.nekdimes.org/PublicData/Routers1_2007.csv - Similar pages - Note this

SYSTEM AND METHOD FOR INTERNET ENDPOINT PROFILING

CROSS REFERENCE TO RELATED APPLICATIONS

This application is a continuation in part application of U.S. patent application Ser. No. 12/104,723 filed Apr. 17, 2008 and entitled "System and Method For Internet Endpoint Profiling," now issued as U.S. Pat. No. 8,019,764 to which this application claims benefit.

BACKGROUND OF THE INVENTION

1. Field of the Invention

The present invention relates to computers and computer networks. More particularly, the invention relates to profiling an Internet endpoint associated with an Internet Protocol (IP) address.

2. Background of the Related Art

Profiling what users are doing on the Internet at a global scale, e.g., which applications and protocols users use, which sites the users access, and who the users try to talk to, are intriguing and important questions for a number of reasons. For example, the profiling results can reveal regional characteristics of cultural and behavioral patterns, important user usage pattern trends, potential exploitation of security vulnerabilities, early indication of user acceptance of a new product or service, etc. The profiling results can be used for various purposes such as strategic development, product/service marketing, network traffic engineering, security enhancement, etc.

The most common way to answer the above questions is to analyze network traces. However, the access issues to network traces at a global scale and the processing power required for analyzing network traces in large volume result in the inapplicability of state-of-art packet-level traffic classification tools for this scenario.

The Internet is composed of machines (e.g., computers or other devices with Internet access) associated with IP addresses for identifying and communicating with each other on the Internet. The Internet and the IP addresses are well known to those skilled in the art. These machines are called endpoints on the Internet. Internet endpoints may act as a server, a client, or a peer in the communication activity on the Internet. In vast majority of scenarios, information about servers such as the IP address are publicly available for user to access. In peer-to-peer (p2p) based communication, in which all endpoints can act both as clients or servers, the association between an end point and the p2p application becomes publicly visible. Even in the classical client-server communication scenario, information about clients such as website user access logs, forums, proxy logs, etc. also stay publicly available. Given that many forms of communication and various endpoint behaviors do get captured and archived, enormous amount of information valuable for profiling or characterizing endpoint behavior at a global scale is publicly available but has not been systematically utilized for such purpose.

SUMMARY

In general, in one aspect, the present invention relates to a method of profiling an Internet endpoint associated with an Internet endpoint domain name, the method includes generating a profiling rule using an Internet search engine, obtaining a search result by inputting the Internet endpoint domain name to the Internet search engine, and classifying the Internet endpoint based on the search result using the profiling rule.

In general, in one aspect, in the method, generating the profiling rule includes obtaining a seed search result by inputting a seed set to the Internet search engine, the seed set comprising a plurality of randomly chosen Internet endpoint identifiers, the seed search result comprising a plurality of hit texts and a Uniform Resource Locator (URL) associated with a hit text of the plurality of hit texts, the plurality of hit texts comprising a plurality of phrases, the hit text comprising a phrase of the plurality of phrases, the Internet endpoint identifiers comprising at least one selected from a group consisting of an Internet Protocol (IP) address, a domain name, and an IP prefix, ranking the plurality of phrases to generate a rank of the phrase based a count of the phrase in the plurality of hit texts, adding the phrase to a key phrase list if the count exceeds a pre-determined threshold, assigning a URL class to the URL if the phrase is added to the key phrase list, the URL class being determined from the phrase based on semantics, determining a IP tag associated with the URL class, the IP tag being determined from the URL class and the phrase based on semantics, and associating the phrase with the URL class in the profiling rule.

In general, in one aspect, the present invention relates to a computer readable medium, embodying instructions executable by the computer to perform method steps for profiling an Internet endpoint associated with an Internet Protocol (IP) prefix, the instructions comprising functionality for generating a profiling rule using an Internet search engine, obtaining a search result by inputting the IP prefix to the Internet search engine, and classifying the Internet endpoint based on the search result using the profiling rule.

In general, in one aspect, in the computer readable medium, generating the profiling rule includes obtaining a seed search result by inputting a seed set to the Internet search engine, the seed set comprising a plurality of randomly chosen Internet endpoint identifiers, the seed search result comprising a plurality of hit texts and a Uniform Resource Locator (URL) associated with a hit text of the plurality of hit texts, the plurality of hit texts comprising a plurality of phrases, the hit text comprising a phrase of the plurality of phrases, the Internet endpoint identifiers comprising at least one selected from a group consisting of an Internet Protocol (IP) address, a domain name, and an IP prefix, ranking the plurality of phrases to generate a rank of the phrase based a count of the phrase in the plurality of hit texts, adding the phrase to a key phrase list if the count exceeds a pre-determined threshold, assigning a URL class to the URL if the phrase is added to the key phrase list, the URL class being determined from the phrase based on semantics, determining a IF tag associated with the URL class, the IP tag being determined from the URL class and the phrase based on semantics, and associating the phrase with the URL class in the profiling rule.

In general, in one aspect, the present invention relates to a for profiling an Internet endpoint associated with an Internet endpoint identifier. The system includes a hardware processor, a profiling rule generator executing on the hardware processor and configured to generate a profiling rule using an Internet search engine, and a profiler operatively coupled to the profiling rule generator, executing on the hardware processor, and configured to obtain a search result by inputting the Internet endpoint identifier as a search phrase to the Internet search engine and classify the Internet endpoint based on the search result using the profiling rule.

Other aspects and advantages of the invention will be apparent from the following description and the appended claims.

BRIEF DESCRIPTION OF DRAWINGS

FIGS. 2A-2C shows a flow chart of a method according to aspects of the invention.

DETAILED DESCRIPTION

Figure 1A:
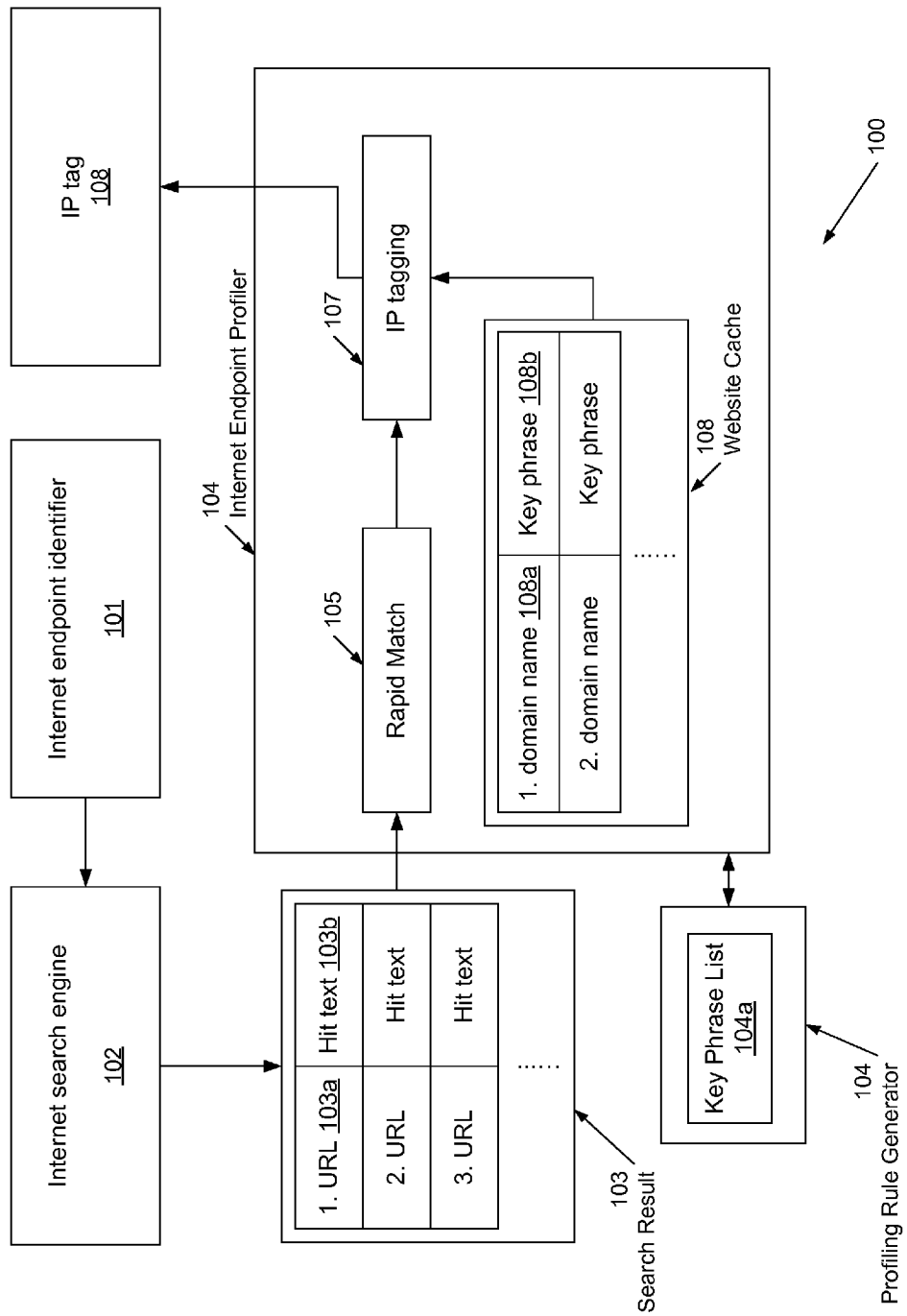
FIG. 1A shows a system block diagram for profiling an Internet endpoint associated with an IF address according to aspects of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

FIG. 1A shows a system block diagram of a system (100) for profiling an Internet endpoint according to aspects of the invention. Here, the system (100) includes an Internet endpoint (not shown) identified by the Internet endpoint identifier (101), an Internet search engine (102) generating a search result (103), a profiling rule generator (104) based on the key phrase list (104a), and an Internet endpoint profiler (104) generating an IP tag (108). The Internet endpoint identifier (101) is used as a search phrase (or input) for the Internet search engine (102).

In one or more embodiments of the invention, the Internet endpoint identifier (101) is an IP address, or a portion thereof, of the Internet endpoint. Generally, the IP address of the Internet endpoint is interpreted as composed of two parts: a network-identifying prefix (i.e., IP prefix of the Internet endpoint) followed by a host identifier within that network.

In one or more embodiments of the invention, the Internet endpoint identifier (101) is an IP prefix of the Internet endpoint. For example, the IP prefix of the Internet endpoint may be determined by correlating the IP address of the Internet endpoint with BGP (Border Gateway Protocol) or WHOIS protocol to find a longest matching prefix. In one or more embodiments, BGP routing tables are used to find the longest matching prefix corresponding to an IP-address. In one or more embodiments WHOIS is used to find the longest prefix registered by an entity, which matches this IP-address.

In one or more embodiments of the invention, the Internet endpoint identifier (101) is a domain name of the Internet endpoint. The Internet endpoint domain name may be a hostname, a top level domain name, a second level domain name, a registered domain name provide by domain name registrars, or other forms of domain names known to one skilled in the art. For example, the Internet endpoint domain name may be determined by performing a reverse domain name service (DNS) query using an IP address of the Internet end point.

An example of Internet endpoint identifier (101) used for illustration below includes 200.101.18.182. An example of Internet search engine (102) that may be used in system (100) includes Google™ search engine, which is a product by Google Corporation. An Internet search engine typically includes the following: (1) Crawler, which collects a snapshot of all the web-pages in at least a portion of the Internet (e.g., World Wide Web), (2) Indexer, which uses the snapshot collected by the crawler to build a reverse-index, defined as a mapping of phrases or words to the web-pages they occur in, (3) Search Infrastructure, where a search query (defined as a combination of phrases or words via operators such as OR, AND, NOT, etc.) is then resolved by making use of the reverse-index. All the documents that match a query are then ranked via pre-determined criteria such as popularity of the web-page, relevance of the query with respect to the web-page in terms of where the query phrases/words appear in the document, etc. Finally, all the web-pages matching a query are returned to the user, where for each result, the user sees the URL for the web-page and the hit-text defined as a portion of the web-page text with the best match with the query.

In the system (100), the Internet search engine (102) receives the Internet endpoint identifier (101) and generates a search result (103), which may be input into the Internet endpoint profiler (104) for generating the IP tag (108) that characterizes the Internet endpoint corresponding to the Internet endpoint identifier (101). The Internet endpoint profiler (104) uses the search result (103) received from the Internet search engine (102) to configure a website cache (108). The Internet endpoint profiler (104) also includes a rapid match module (105) and an IP tagging module (107). As shown in FIG. 1A, the IP tagging module (107) may receive an input directly from the rapid match module (105) under certain match condition based on the search result (103). Alternatively, the IP tagging module (107) may receive an input from the rapid match module (105) via the website cache (108) if the match condition is not satisfied based on the search result (103). The details of the match condition is described later with respect to FIG. 2C below.

Further as shown in FIG. 1A, the search result (103) may include one or more search result identifier with associated hit text (e.g., hit text (103b)). The search result identifier is used to identify the identity or name of a resource (e.g., a website or a document on the Internet), which is the result of the search from the search engine. The search result identifier is typically a Uniform Resource Locator (URL) (e.g., URL (103a)) that in most cases is a synonym with Uniform Resource Identifier (URI) as described on the Internet Engineering Task Force (IETF) RFC-3986 document. Each URL may include a search result domain name, which identifies where the search result resides, such as a computer, computers, or other machines on the Internet. The search result domain name may be a hostname, a top level domain name, a second level domain name, a registered domain name provide by domain name registrars, or other forms of domain names known to one skilled in the art. Further, one machine with one IP address may provide different websites using different domain names in virtual hosting. Accordingly, different search results with different search results domain names may actually reside on the same one machine with one IP address.

The hit text may include one or more phrases (e.g., a word, bi-word, or other word combination forming a phrase), from which a key phrase list (104a) may be formed based on a ranking scheme. The website cache (108) has multiple entries. Each website cache entry may include a search result domain name (e.g., domain name (108a)) and an associated key phrase (e.g., key phrase (108b)) from the key phrase list (104a). More details of generating the key phrase list (104a) to form a profiling rule and configuring the website cache (108) are described in more detail in reference to FIGS. 2A-2C and TABLES 1-4 below.

Figure 1B:
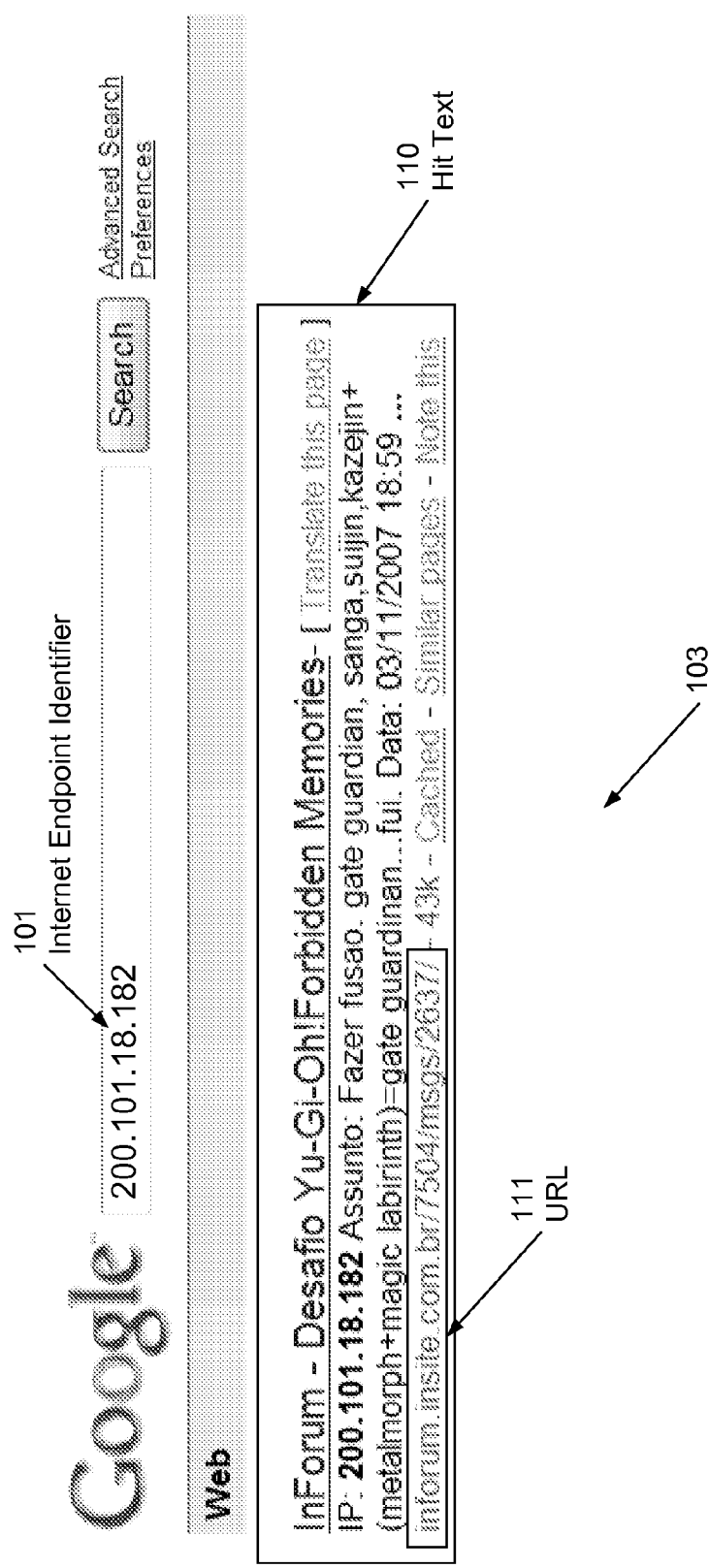
FIG. 1B depicts an exemplary search result using an IP address as a search phrase according to aspects of the invention.

FIG. 1B shows an example of the search result (103) generated by inputting the Internet endpoint identifier (101) (e.g., the IP address "200.101.18.182") to the Internet search engine (102) (e.g., the Google™ search engine). Here, the search result (103) includes a single entry of the hit text (110), which includes the URL (111). In this example, the URL (111) includes a search result domain name "inforum.insite.com". In one or more embodiments of the invention, the hit text (110) may be expanded to include the entire content of the website (or webpage) referenced by the URL (111).

Example IP prefixes containing the IP address "200.101.18.182" include "200.101.18.0/24" containing total $2^8$ IP addresses, "200.101.0.0/16" containing total $2^{16}$ IP addresses, "200.0.0.0/8" containing total $2^{24}$ IP addresses, etc. For example, if the IP prefix "200.101.18.0/24" is used as the search phrase, the collection, or a portion thereof, of the $2^8$ IP addresses "200.101.18.0" through "200.101.18.255" are used as search phrases and inputted into the search engine one at a time to obtain multiple search result entries in the search result (103).

Figure 1C:
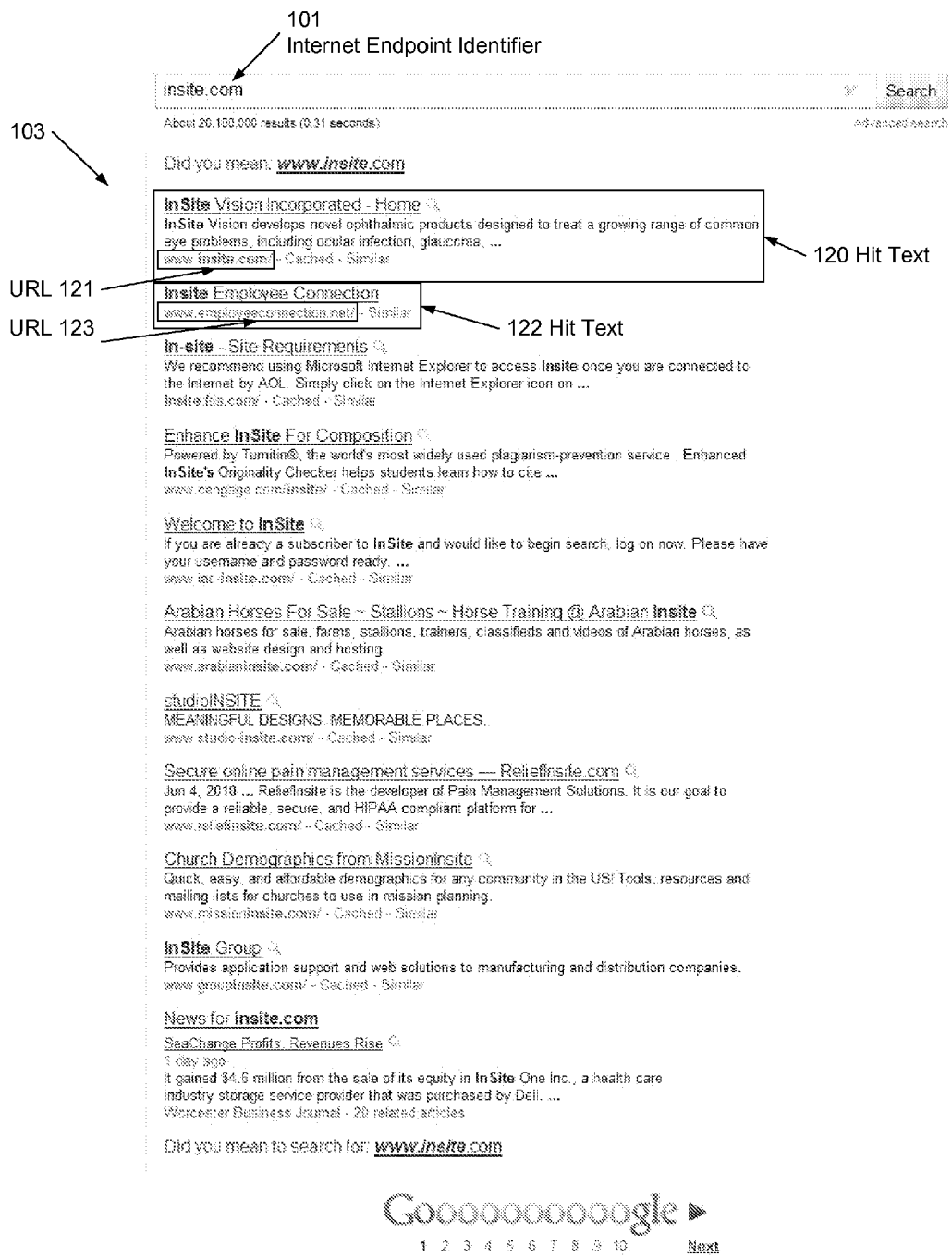
FIG. 1C depicts an exemplary search result using a domain name as a search phrase according to aspects of the invention.

FIG. 1C shows an example of the search result (103) generated by inputting the Internet endpoint identifier (101) (e.g., the domain name "insite.com") to the Internet search engine (102) (e.g., the Google™ search engine). Here, the search result (103) includes multiple entries including the hit text (120), which includes the URL (121), the hit text (122), which includes the URL (123), among other hit texts. In this example, the URL (121) includes a search result domain name "insite.com", the URL (123) includes a search result domain name "employeeconnection.net". In one or more embodiments of the invention, the hit text (120) and/or the hit text (122) may be expanded to include the entire content of the websites (or webpage) referenced by the URL (121) and/or the URL (123).

Figure 2C:
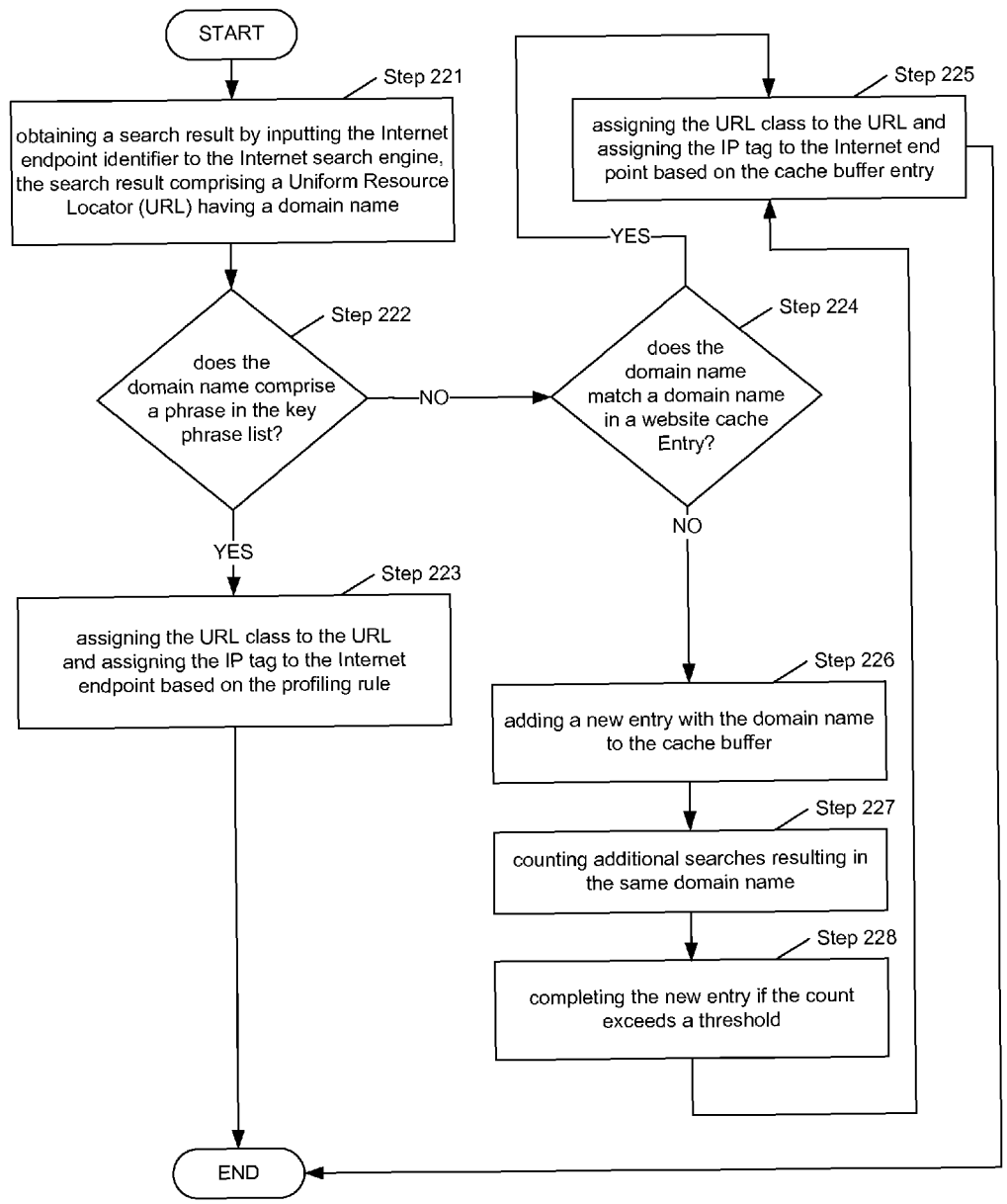

FIGS. 2A-2C shows a flow chart of a method according to aspects of the invention. The method may be practiced, for example using the system (100) described with respect to FIGS. 1A and 1B above. As shown in FIG. 2A, initially, a profiling rule is generated using an Internet search engine (e.g., the Internet search engine (102)) (Step 201). The profiling rule may be applied for profiling an Internet endpoint in a profiler (e.g., the Internet endpoint profiler (104)). Subsequently, the Internet endpoint may be profiled by inputting the associated Internet endpoint identifier (e.g., the Internet endpoint identifier (101) of FIG. 1A) to the Internet search engine to obtain a search result (e.g., the search result (103) of FIG. 1A) (Step 202). The internet endpoint may then be classified (e.g., by the Internet endpoint profiler (104)) using the profiling rule (Step 203).

FIG. 2B shows details of generating the profiling rule in the step (201) of FIG. 2A. Here, a seed set of randomly selected Internet endpoint identifiers (e.g., IP addresses, IP prefixes, or domain names) are inputted into the Internet search engine to obtain a seed search result (Step 211). Each of the search result may include a hit text (e.g., the hit text (101) of FIG. 1B) and a URL (e.g., the URL (111) of FIG. 1B). The phrases from all the hit texts (e.g., identified by a string matching algorithm) may be ranked based on the frequency of occurrence in the seed search result (Step 212). A key phrase list (e.g., the key phrase list (104a) of FIG. 1A) may be created containing the top ranked key phrases based on a pre-determined threshold (e.g., phrases exceeding 50 occurrences, the top 50 ranked phrases, etc.) (Step 213). For each phrase added to the key phrase list, a URL class is determined for classifying the corresponding URL based on semantics relating to the phrase and associated hit text (Step 214). In addition, an IP tag associated with the URL class is determined based on semantics relating to the URL class and the phrase (Step 215). Accordingly, the phrase added to the key phrase list and the associated URL class and the IP tag are included in the profiling rule (Step 216).

FIG. 2C shows details of steps (202) and (203) of FIG. 2A where the Internet endpoint is profiled using the profiling rule. Here, the Internet endpoint identifier (e.g., IP address or a portion thereof, domain name, or IP prefix) of the Internet endpoint to be profiled is inputted into the Internet search engine to obtain a URL with a domain name in the search result (Step 221). A comparison is made (e.g., by the rapid match module (105)) as to whether the domain name contains a phrase in the key phrase list (Step 222). If the domain name does contain a phrase in the key phrase list, the URL class and the IP tag associated with the phrase in the profiling rule are used to classify the URL and the Internet endpoint (Step 223).

If the domain name does not contain a phrase in the key phrase list in the comparison of Step 222, the domain name is looked up, for example in a list, table, cache, or other suitable data structure (e.g., website cache (108)). If the domain name is not found in any entry of the data structure (Step 224), a new entry containing the domain name is added to the data structure (Step 226). This new entry may start out with a null value as the key phrase. The Internet endpoint may not be classified at this point. A counter may be initialized for tracking additional Internet endpoint identifiers inputted into the Internet search engine that also come up with the same domain name in the corresponding search results. Once the occurrence of this domain name exceeds a pre-determined threshold, the value of this new entry is determined, to complete the new entry, based on all related phrases associated with this domain name from these search results (Step 228). Accordingly, the previous Internet endpoint, which produced this domain name in the search results may now be classified by the completed entry in the data structure (e.g., website cache (108)) (Step 225).

Figures 3A, 3B:
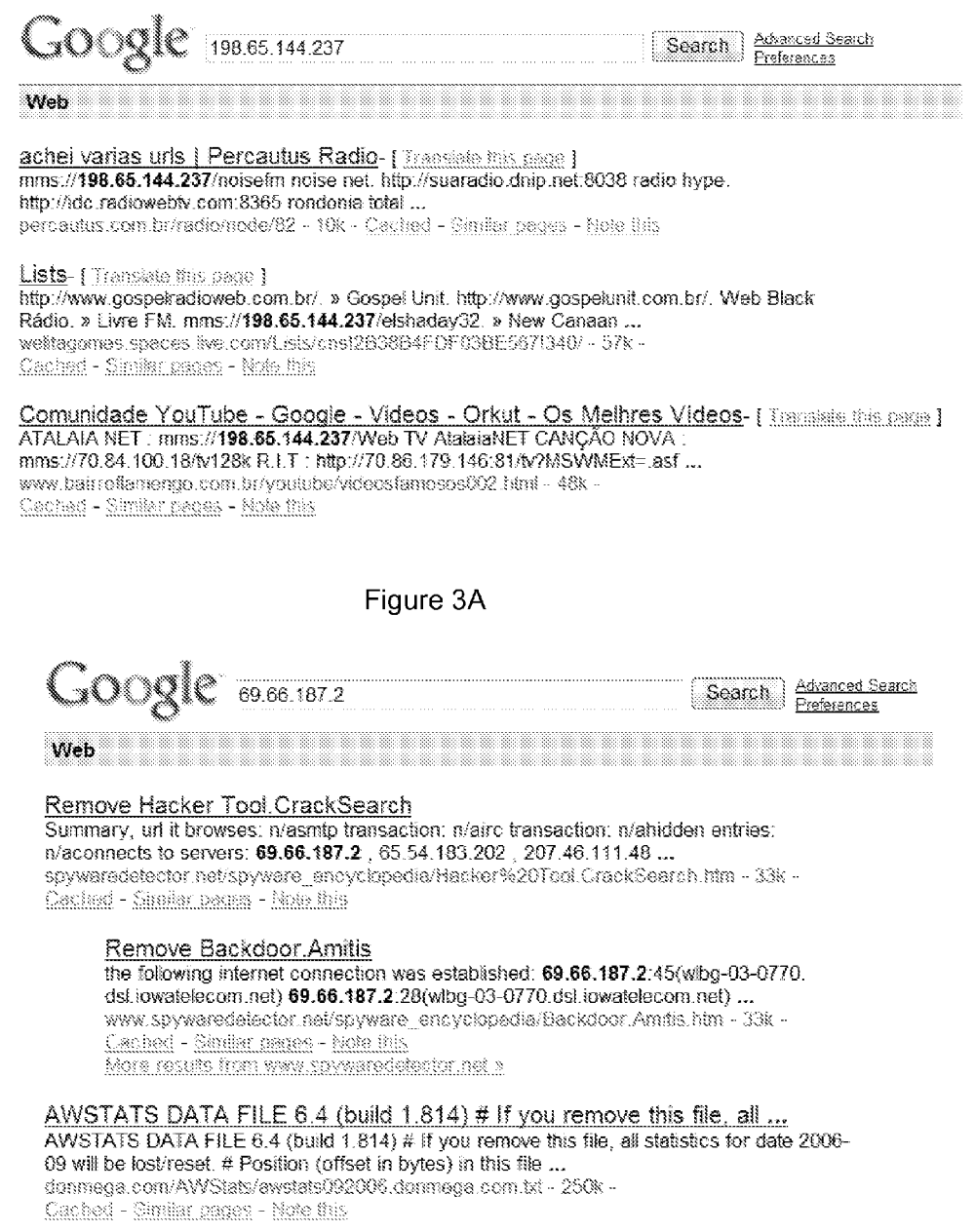

FIGS. 3A-3W depicts additional exemplary search results associated with an IP address according to aspects of the invention. In each of these exemplary search results, a URL and a key phrase are identified. In addition, URL classes and IP tags are determined based on semantics. TABLE 1 below lists exemplary key phrases (denoted as "Keywords") in an exemplary key phrase list and corresponding URL classes (denoted as "Website Class") and IP tags (denoted as "Tags") forming an exemplary profiling rule. Key phrases in a group are separated by "|" where each group is bracketed with "{ }". Multiple groups may be combined using logical operators such as "&". Parameters within "< >" in a IP tag are specific parameters associated with the corresponding URL classes that are extracted from the hit text based on semantics. Parameters within "[ ]" in a IP tag are general relevant information extracted from the hit text based on semantics.

While the key phrases in these exemplary search results are determined based on specific method steps described with respect to FIG. 2B above. The URL classes and IP tags are determined based on semantics, i.e., study of the descriptive meaning from the hit text. Although examples of the URL classes, IP tags, and parameters within "< >" and "[ ]" are given using particular choices of descriptive wordings, it will be apparent to those skilled in the art with the benefit of this disclosure that other suitable wordings or terminologies may also be used without deviating from this invention.

TABLE 1

Example key phrase list and profiling rule

| Keywords | Website Class | Tags |
| --- | --- | --- |
| {'ftp' | 'webmail' | 'dns' | 'email' | 'proxy' | 'smtp' | 'mysql' | 'pop3' | 'mms' | 'netbios'} | Protocols and Services | <protocol name> server |
| {'trojan' | 'worm' | 'malware' | 'spyware' | 'bot'} | Malicious information list | 'issue name> affected host |
| 'spam' | Spamlist | spammer |
| {'blacklist' | 'banlist' | 'ban' | 'blocklist'} | Blacklist | blacklisted |
| 'adserver' | Ad-server list | adserver |
| {'domain' | 'whois' | 'website'} | Domain database | website |
| {'dns' | 'server' | 'ns'} | DNS list | DNS server |
| {'proxy' | 'anonymous' | 'transparent'} | Proxy list | proxy server |
| 'router' | Router addresses list | router |
| 'mail server' | Mail server list | mail server |
| 'mail server' & {'spam' | 'dictionary attacker'} | Malicious mail servers list | mail server [spammer] [dictionary attacker] |
| {'counter strike' | 'warcraft' | 'age of the empires' | 'quake' | 'halo' | 'game'} | Gaming servers list | <game name> server |
| {'counter strike' | 'warcraft' | 'age of the empires |' 'quake' 'halo' | 'game'} & {'abuse' | 'block'} | Gaming abust list | <game> node [abuser] [blocked] |
| {'torrent' | 'emule' | 'kazaa' | 'edonkey' | 'announce' | 'tracker' | 'xunlei' | 'limewire' 'bitcomet' | 'uusee' | 'qqlive' | 'pplive' } | p2p node list | <protocol name> p2p node |
| {'irc' | 'undernet' | 'innernet' | 'dal.net'} | IRC servers list | IRC server |
| {'yahoo' | 'gtalk' | 'msn' | 'qq' | 'icq' | 'server' | 'block'} | Chat servers | <protocol name> chat server |
| {'generated by' | 'awstats' | 'wwwstat' | 'counter' | 'stats'} | Web log site | web user [operating system] [browser][date] |
| {'cachemgr' | 'ipcache'} | Proxy log | proxy user [site accessed] |
| {'forum' | 'answer' | 'resposta' | 'response' | 'comment' | 'comentario' | 'commentaire' | 'posted' | 'poste' | 'registered'| 'registrado' | 'enregistre' | 'created' | 'criado' 'cree' | 'bbs' | 'board' | 'club' | 'guestbook' | 'cafe' } | Forum | forum user [date][user name] [http share ][ftp_share] [streaming node] |

FIG. 3A depicts the search result from inputting the IP address 198.65.144.237 into the Google™ search engine. Here, the key phrase "mms" is found in the hit text, therefore the URL class "Protocols and Services" is assigned to the URLs "percautus.com.br/radio", "welitagomes.spaces.live.com", and "www.bairroflamengo.com.br". Upon browsing at least one of the website using the URL, it is found that streaming radios is listed. This IP address is therefore classified (or tagged) as a "<mms> server" based on semantics.

FIG. 3B depicts the search result from inputting the IP address 69.66.187.2 into the Google™ search engine. Here, the key phrase "spyware" is found in the first two URLs in the hit text, therefore the URL class "Malicious information list" is assigned to the URL "spywaredetector.net". Upon browsing the website using the URL, it is found that spyware is listed. This IP address is therefore classified (or tagged) as a <spyware> affected hosts based on semantics. In addition, the key phrase "awstats" is found in the third URL in the hit text, therefore the URL class "Web log site" is assigned to the URL "donmega.com". This IP address is therefore also classified (or tagged) as "web user" based on semantics.

Figure 3C:
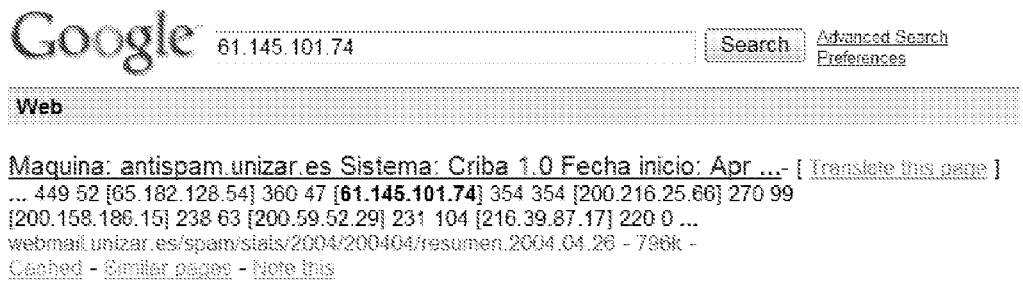
FIGS. 3A-3W depicts additional exemplary search results associated with an IP address according to aspects of the invention.

FIG. 3C depicts the search result from inputting the IP address 61.145.101.74 into the Google™ search engine. Here, the key phrase "spam" is found in the URL in the hit text, therefore the URL class "spamlist" is assigned to the URL "webmail.unizar.es/spam". This IP address is therefore classified (or tagged) as a "spammer" based on semantics.

Figure 3D:
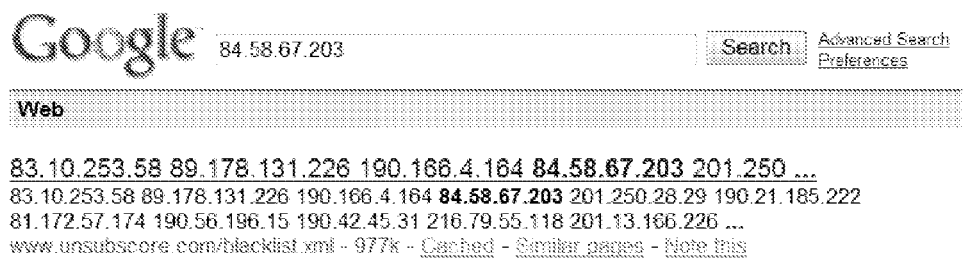

FIG. 3D depicts the search result from inputting the IP address 84.58.67.203 into the Google™ search engine. Here, the key phrase "blacklist" is found in the URL in the hit text, therefore the URL class "blacklist" is assigned to the URL "www.unsubscore.com". This IP address is therefore classified (or tagged) as "blacklisted" based on semantics.

Figure 3E:
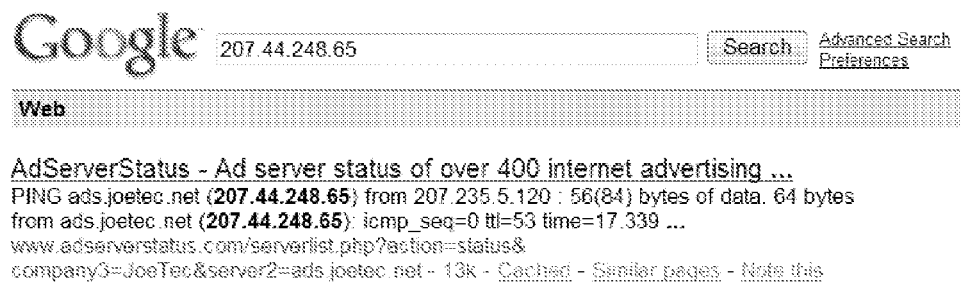
Figures 3J, 3K:
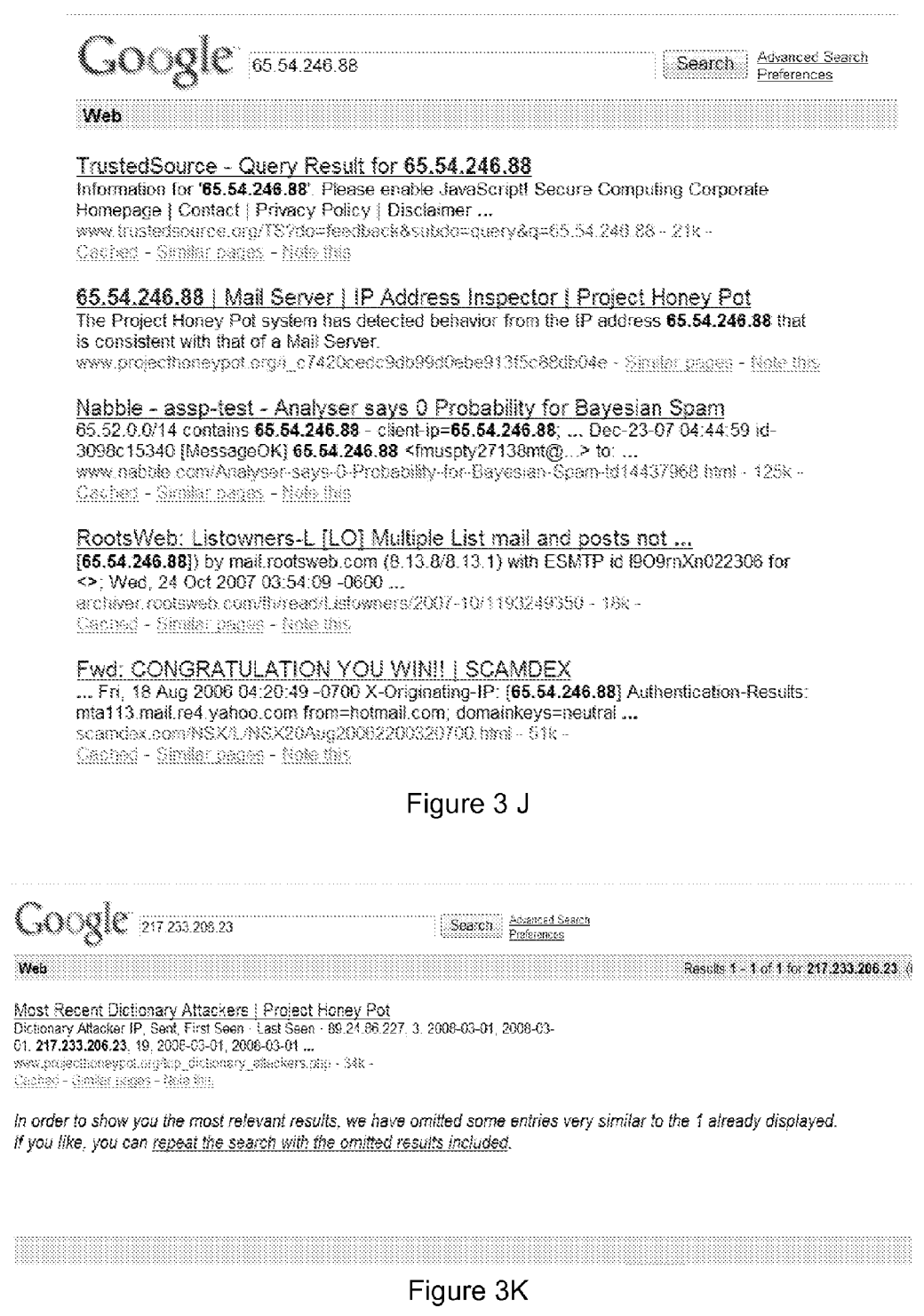
Figure 3O:
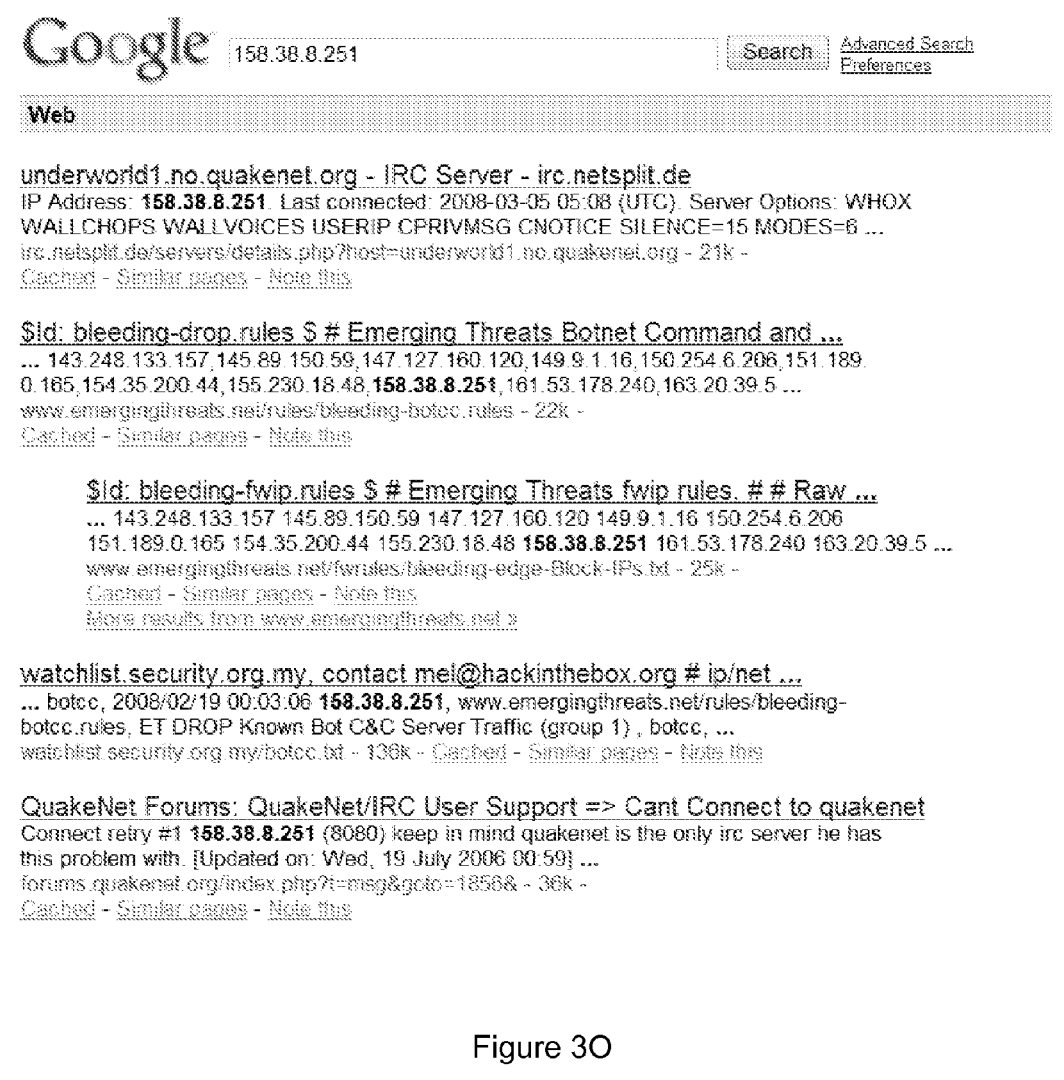
Figures 3P, 3Q:
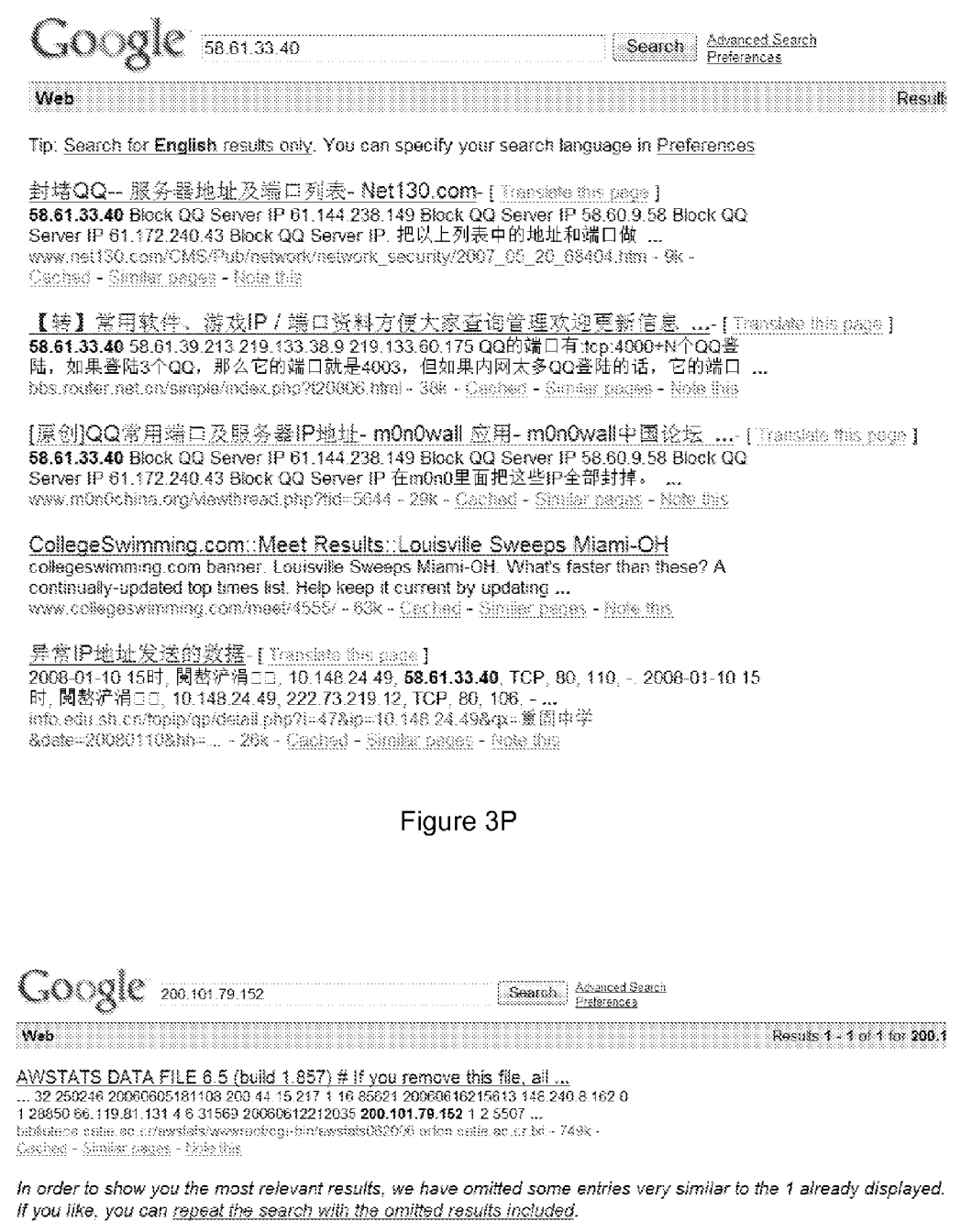
Figures 3R, 3S:
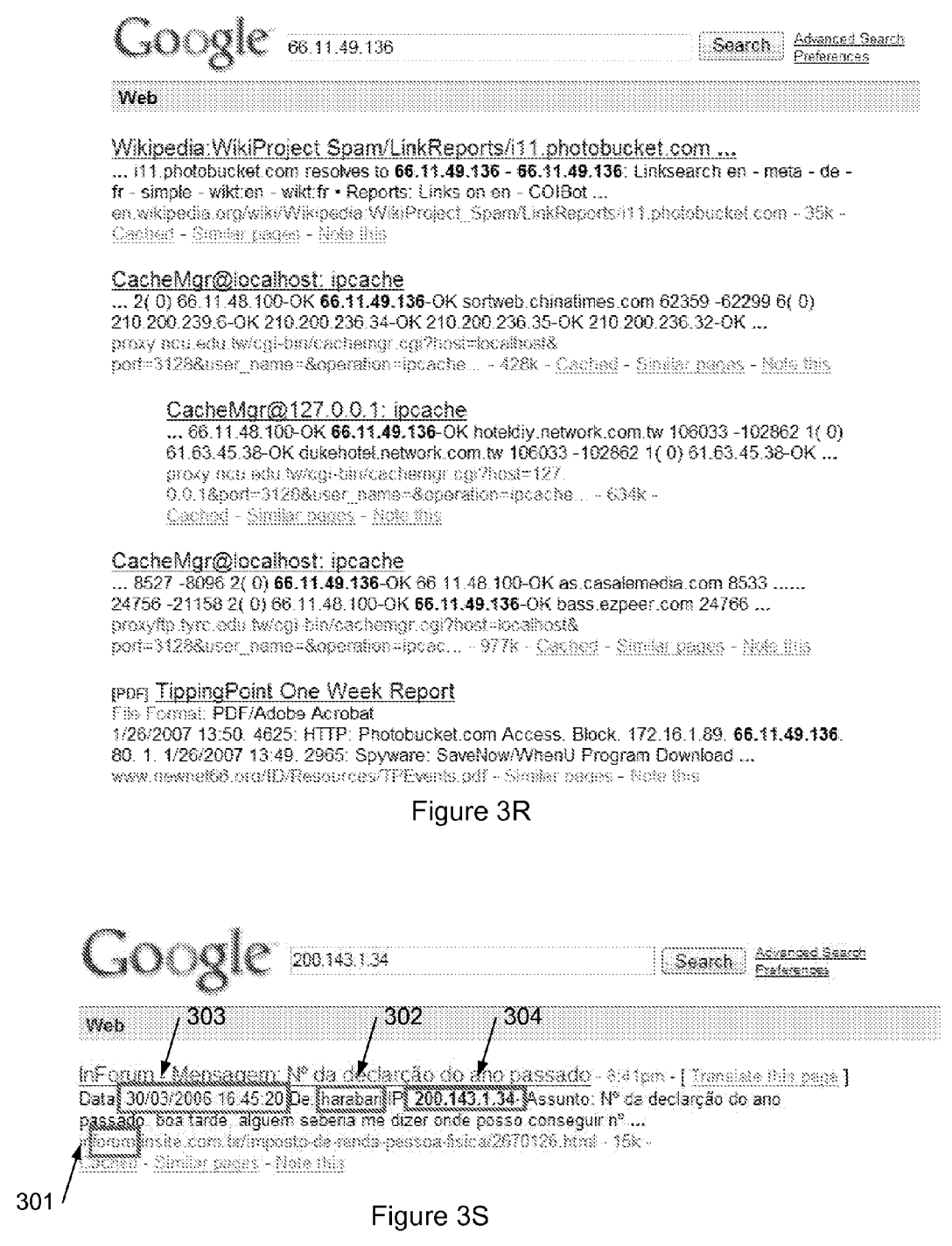

FIG. 3E depicts the search result from inputting the IP address 207.44.248.65 into the Google™ search engine.

Here, the key phrase "adserver" is found in the first URL in the hit text, therefore the URL class "Ad-server list" is assigned to the URL "www.adserverstatus.com". This IP address is therefore classified (or tagged) as "ad-server" based on semantics.

FIG. 3F depicts the search result from inputting the IP address 216.127.55.45 into the Google™ search engine. Here, the key phrase "whois" is found in the first URL in the hit text, therefore the URL class "Domain database" is assigned to the URL "www.coolwhois.com". Upon browsing the website using the URL, it is found that whois is listed. This IP address is therefore classified (or tagged) as "website" based on semantics.

FIG. 3G depicts the search result from inputting the IP address 69.111.95.106 into the Google™ search engine. Here, the key phrase "DNS" is found in the first three URLs in the hit text, therefore the URL class "DNS list" is assigned to the URL "www.dnsserverlist.org", "www.walltechnet.com", and "www.whois.ws". Upon browsing the website using at least one of the URLs, it is found that DNS servers are listed. This IP address is therefore classified (or tagged) as "DNS servers" based on semantics. In addition, the key phrases "whois" and "forum" are also found in other sections in the hit text of the search results. Therefore additional URL classes and IP tags may be assigned based on those results to further profiling the IP address.

FIG. 3H depicts the search result from inputting the IP address 201.229.208.2 into the Google™ search engine. Here, the key phrase "PROXY" is found in the last two sections in the hit text, therefore the URL class "proxy list" is assigned to the URL "goodbyefirewall.cn" and "www.proxy-hut.org". This IP address is therefore classified (or tagged) as "Proxy servers" based on semantics.

FIG. 3I depicts the search result from inputting the IP address 195.242.214.33 into the Google™ search engine.

Here, the key phrase "router" is found in the URL in the hit text, therefore the URL class "Router addresses list" is assigned to the URL "www.netdimes.org". This IP address is therefore classified (or tagged) as "router" based on semantics.

FIG. 3J depicts the search result from inputting the IP address 65.54.246.88 into the Google™ search engine. Here, the key phrase "Mail server" is found in the second section in the hit text, therefore the URL class "Mail server list" is assigned to the URL "www. Projecthoneypot.org". This IP address is therefore classified (or tagged) as "Mail server" based on semantics.

FIG. 3K depicts the search result from inputting the IP address 217.233.206.23 into the Google™ search engine. Here, the key phrase "dictionary attacker" is found in the URL in the hit text. In addition the key phrase "Mail server" is found in the webpage referenced by the URL, therefore the URL class "Malicious mail server list" is assigned to the URL "www.projecthoneypot.org". This IP address is therefore classified (or tagged) as "Mail server [dictionary attacker]" based on semantics.

FIG. 3L depicts the search result from inputting the IF address 200.199.201.101 into the Google™ search engine. Here, the key phrase "Counter-Strike" is found in the second section in the hit text, therefore the URL class "Gaming servers list" is assigned to the URL "forum.counter-strike-br.com.br". This IP address is therefore classified (or tagged) as "<Counter strike> server" based on semantics. In addition, the key phrase "forum" is also found in the hit text. Additional details of how "forum" key word is treated can be found with respect to FIG. 3S below.

FIG. 3M depicts the search result from inputting the IF address 200.101.75.139 into the Google™ search engine. Here, the key phrase "quakeabuse" is found in the first URL in the hit text, therefore the URL class "Gaming abuse list" is assigned to the URL "www.quakeabuse.org". This IP address is therefore classified (or tagged) as "<quake>[abuser]" based on semantics.

FIG. 3N depicts the search result from inputting the IP address 220.164.140.199 into the Google™ search engine. Here, the key phrase "eMule" is found in the first section in the hit text as well as the URL in the hit text, therefore the URL class "P2P node list" is assigned to the URL "forum.emule-project.net". This IP address is therefore classified (or tagged) as "<emule> p2p node" based on semantics. In addition, the key phrase "forum" is also found in the hit text. Additional details of how "forum" key word is treated can be found with respect to FIG. 3S below.

FIG. 3O depicts the search result from inputting the IP address 158.38.8.251 into the Google™ search engine. Here, the key phrase "IRC" is found in the first section in the hit text, therefore the URL class "IRC server list" is assigned to the URL "irc.netsplit.de". This IP address is therefore classified (or tagged) as "IRC server" based on semantics. In addition, the key phrase "forum" is also found in the hit text. Additional details of how "forum" key word is treated can be found with respect to FIG. 3S below.

FIG. 3P depicts the search result from inputting the IP address 58.61.33.40 into the Google™ search engine. Here, the key phrase "qq" is found in the first three sections in the hit text, therefore the URL class "Chat servers" is assigned to the URL "www.net130.com", "bbs.router.net.cn", and "www.m0n0china.org". This IP address is therefore classified (or tagged) as "<QQ> chat server" based on semantics.

FIG. 3Q depicts the search result from inputting the IP address 200.101.79.152 into the Google™ search engine. Here, the key phrase "awstats" is found in the URL in the hit text, therefore the URL class "Web log site" is assigned to the URL "biblioteca.catie.ac.cr". This IP address is therefore classified (or tagged) as "web user" based on semantics.

FIG. 3R depicts the search result from inputting the IP address 66.11.49.136 into the Google™ search engine. Here, the key phrases "proxy", "cachemgr", and "ipcache" are found in the second, third, and fourth sections in the hit text, therefore the URL class "Proxy log" is assigned to the URL "proxy.ncu.edu.tw", "proxyftp.tyrc.edu.tw". This IP address is therefore classified (or tagged) as "proxy user" based on semantics.

FIG. 3S depicts the search result from inputting the IP address 200.143.1.34 into the Google™ search engine. Here, the key phrase "forum" (301) is found in the URL in the hit text, therefore the URL class "forum" is assigned to the URL "inforum.insite.com.br". The user name "harabari" (302) and post date "30/03/2006" (303) associated with the IP address "200.143.1.34" (304) can also be determined based on semantics. This IP address is therefore classified (or tagged) as "forum user [30/03/2006] [harabari]" based on semantics.

Figure 3T:
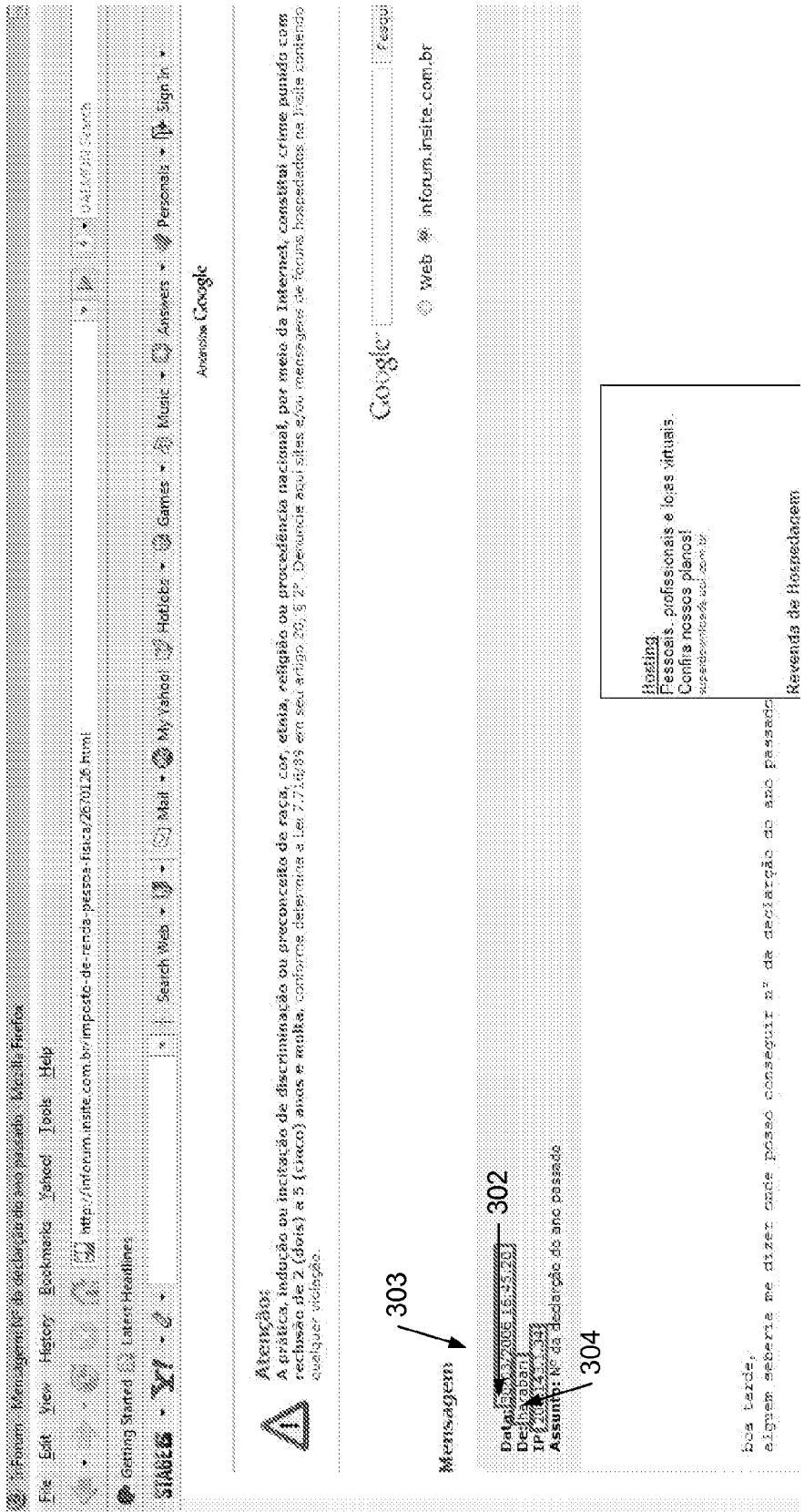

FIG. 3T depicts the web page referenced by the URL "inforum.insite.com.br", which confirms the user name (302) and post date (303) associated with the IP address "200.143.1.34" (304).

Figure 3U:
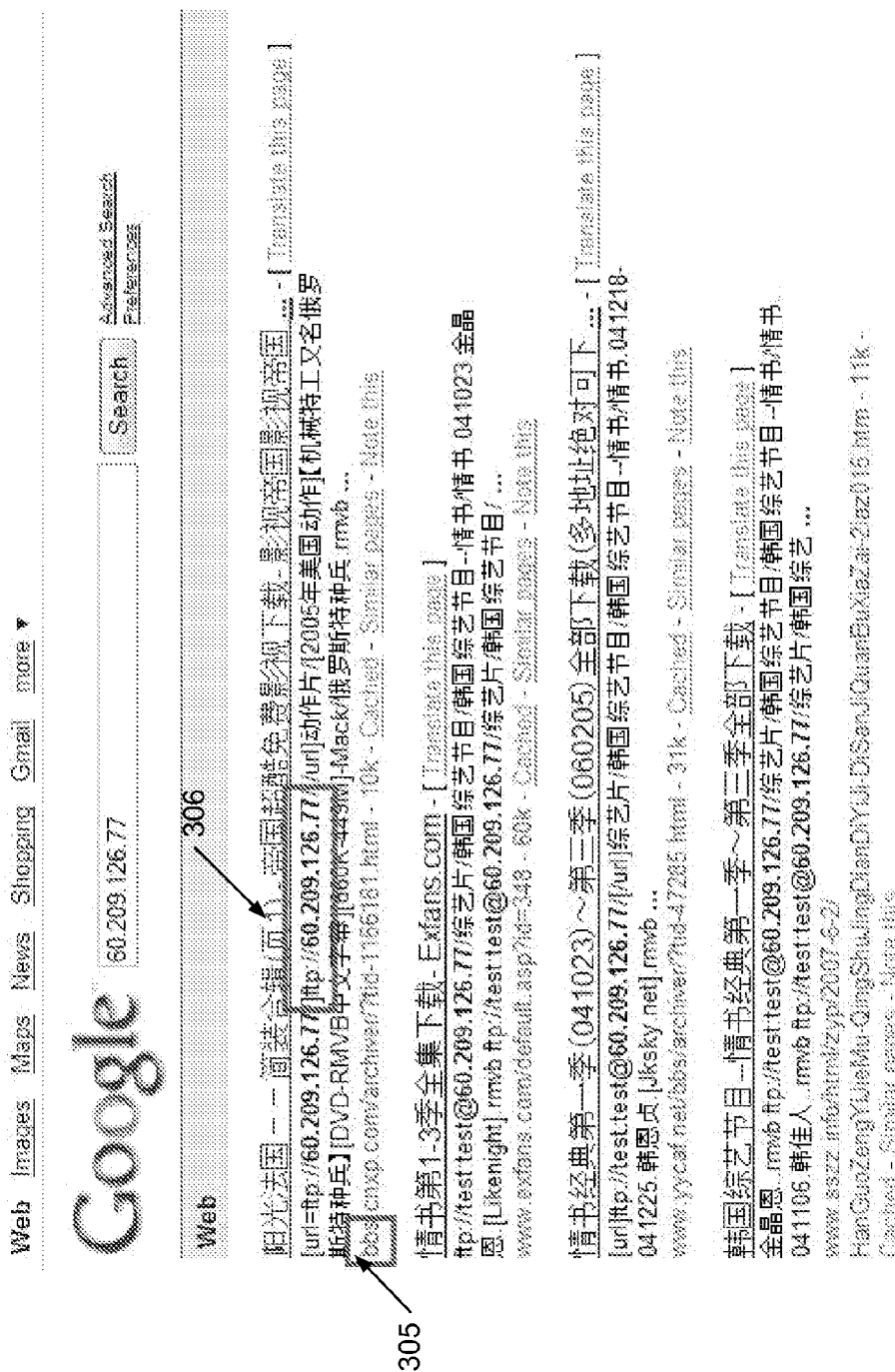

FIG. 3U depicts the search result from inputting the IP address 60.209.126.77 into the Google™ search engine. Here, the key phrase "bbs" (305) is found in the URL in the hit text, therefore the URL class "forum" is assigned to the URL "bbs.cnxp.com". A ftp address (306) can also be determined based on semantics. This IP address is therefore classified (or tagged) as "forum user [ftp_share]" based on semantics.

Figure 3V:
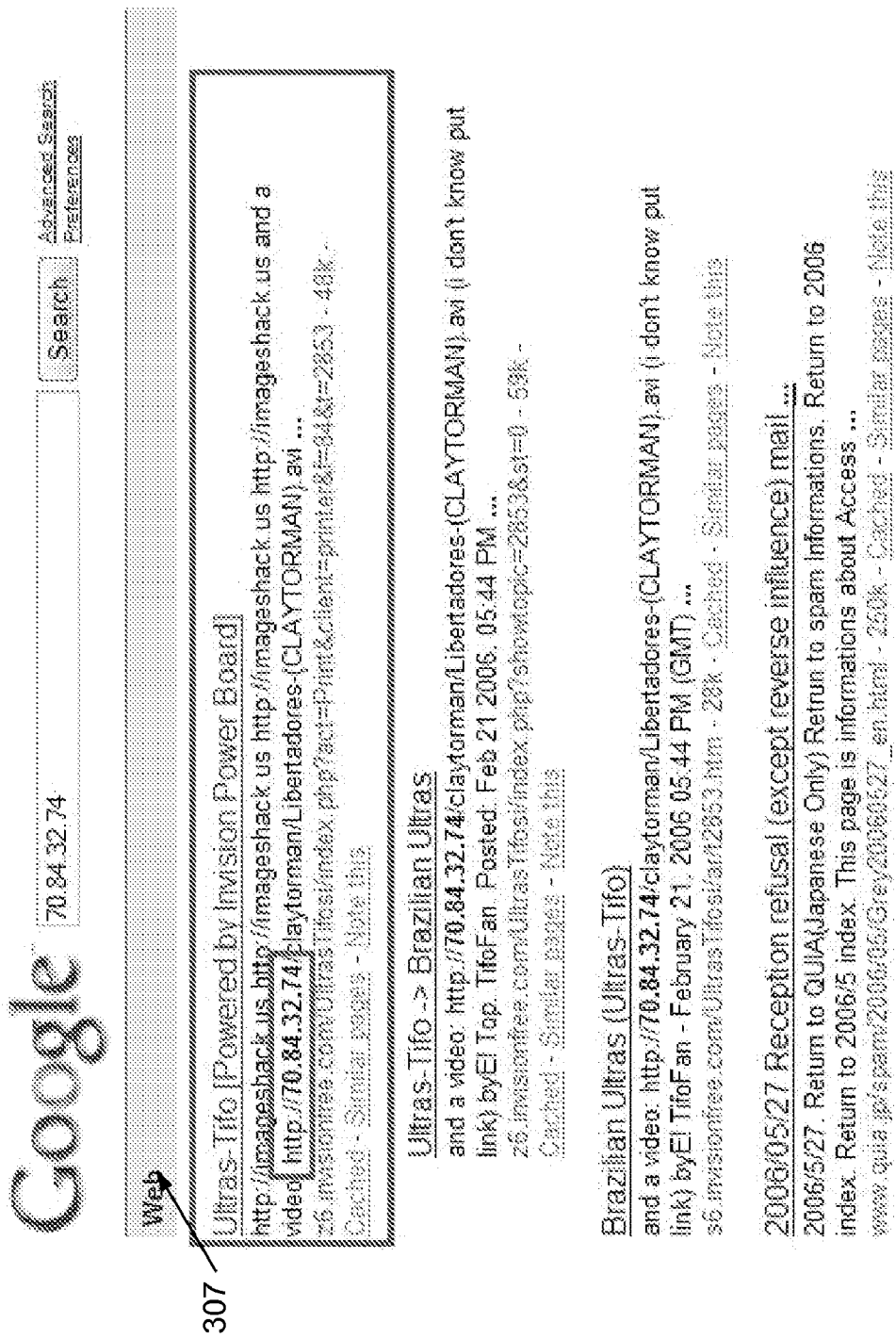
Figure 3W:
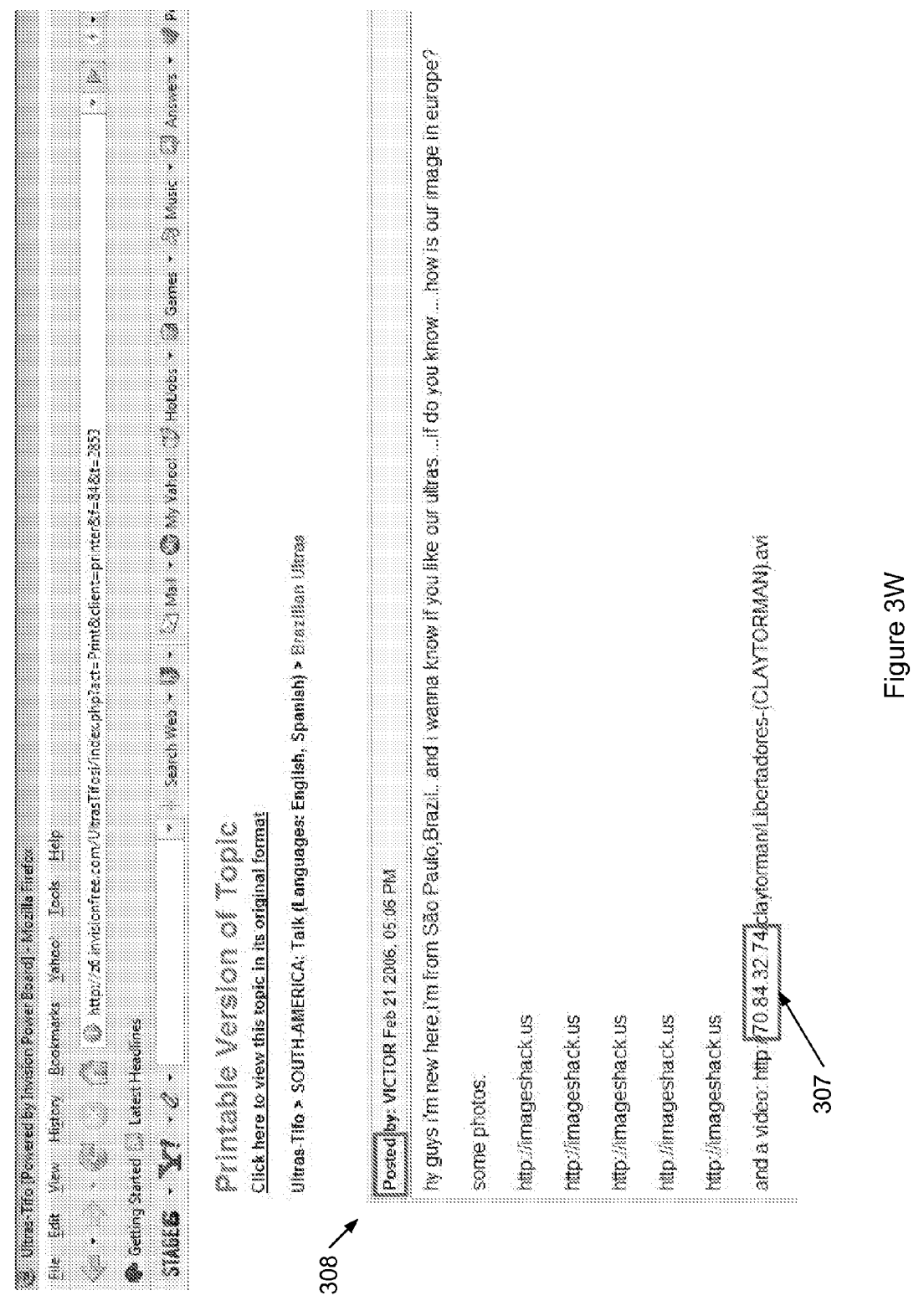

FIGS. 3V and 3W depict the search result from inputting the IP address 70.84.32.74 into the Google™ search engine and the web page referenced by the URL "z6.invisionfree.com" found in the hit text of the search result. Here, the key phrase "posted" (308) is found in the web page of FIG. 3W, therefore the URL class "forum" is assigned to the URL "z6.invisionfree.com". A http address (307) can also be determined based on semantics in the hit text of FIG. 3V as well as the web page of FIG. 3W. This IP address is therefore classified (or tagged) as "forum user [http_share]" based on semantics.

Exemplary Internet endpoints profiling has been conducted over a large collection of associated IP addresses. TABLE 2 shows the networks in three geographical area: Asia (China), South America (Brazil), North America (US), and Europe (France). The Asian and South American internet service provider (ISP) network studied serve the IP addresses in the /17 and /18 range, while the North American and European ISP network studied serve larger IP address range. The "/XX" notation used here represents "$2^{32-XX}$" and specifies an IP prefix including $2^{XX}$ IP addresses. Some of the IP ranges in TABLE 2 are anonymized for privacy reasons.

TABLE 2

| Example IP prefixes | | | |
| --- | --- | --- | --- |
| Asia | S. America | N. America | Europe |
| XXX.39.0.0/17 | XXX.96.128.0/17 | XXX.160.0.0/12 | 62.147.0.0/16 |
| XXX.172.0.0/18 | XXX.101.0.0/17 | XXX.160.0.0/13 | 81.56.0.0/15 |
| XXX.78.192.0/18 | XX.X.103.0.0/17 | XXX.168.0.0/14 | 82.64.0.0/14 |
| XXX.83.128.0/17 | XXX.140.128.0/18 | XXX.70.0.0/16 | |
| XXX.239.128.0/18 | XXX.163.0.0/17 | XX.X.0.0.0/11 | |
| XXX.69.128.0/17 | XXX.193.192.0/18 | | |
| X.X.X.72.0.0/17 | X.XX.10.128.0/18 | | |
| | XXX.14.64.0/18 | | |

TABLE 2-continued

Example IP prefixes

| Asia | S. America | N. America | Europe |
|---|---|---|---|
| | XXX.15.64.0/18 | | |
| | X.XX.24.0.0/18 | | |
| | XXX..25.64.0/18 | | |
| | XXX.34.0.0/18 | | |

An exemplary website cache (e.g., described with respect to FIGS. 1A and 2C) is depicted in TABLE 3 below based on the profiling results corresponding to TABLE 2. Here, three website caches are separately created for the North American, Asian, and South American regions. In each region, 10 top website cache entries are listed as "Nr" 1 through 10. The domain name portion of the entries are listed under "Site" with value portion of the entries listed under "Info" using notations described in the bottom row of TABLE 3. The value portion represents the key phrases determined as described with respect to examples in FIGS. 3A-3S above.

TABLE 3

Example website cache

| | N. America | | | | Asia | | | | S. America | | |
|---|---|---|---|---|---|---|---|---|---|---|---|
| Nr | Site | Hits | Info | Nr | Site | Hits | Info | Nr | Site | Hits | Info |
| 1 | whois.domaintools.com | 338 | D | 1 | jw.dhu.edu.cn | 1381 | S | 1 | weblinux.ciasc.gov.br | 395 | S |
| 2 | en.wikipedia.org | 263 | F | 2 | projecthoneypot.org | 377 | M | 2 | projecthoneypot.org | 371 | M |
| 3 | robtex.com | 255 | BDM | 3 | info.edu.sh.cn | 268 | S | 3 | robtex.com | 252 | BDN |
| 4 | projecthoneypot.org | 217 | M | 4 | czstudy.gov.cn | 227 | S | 4 | redes.unb.br | 252 | S |
| 5 | extremetracking.com | 202 | S | 5 | qqdj.gov.cn | 181 | S | 5 | pt.wikipedia.org | 200 | F |
| 6 | botsvsbrowsers.com | 182 | W | 6 | zhidao.baidu.com | 176 | F | 6 | applant.net | 136 | S |
| 7 | cuwhois.com | 151 | D | 7 | lbl.org | 154 | B | 7 | www.tracemagic.net | 116 | S |
| 8 | proxy.ncu.edu.tw | 132 | P | 8 | cqlp.gov.cn | 149 | S | 8 | www.luziania.com.br | 91 | F |
| 9 | comp.nus.edu.sg | 116 | S | 9 | cache.vagaa.com | 142 | T | 9 | pgl.yoyo.org | 90 | A |
| 10 | quia.jp | 108 | M | 10 | bid.sei.gov.cn | 122 | S | 10 | netflow3.nhlue.edu.tw | 76 | S |
| Cache size: 827 | | | | Cache size: 892 | | | | Cache size: 728 | | | |

A:adservers, B:blacklist, D:domaindb, F:forum, M:mail/spam, N:dnsdb, P:proxy cache, S:Web logs, T:torrent, W:bot detector An exemplary key phrase list (e.g., described with respect to FIGS. 2A and 2B) is depicted in TABLES 4A and 4B below based on the profiling results corresponding to TABLE 2. The leftmost column of each of TABLES 4A and 4B lists exemplary URL classes. Key phrases associated with the URL classes are listed in separate columns in TABLES 4A and 4B for each of the four geographical areas. Each key phrase is also tagged with exemplary number of occurrences in creating the key phrase list.

TABLE 4A

Example key phrase list

| | Asia (China) | S. America (Brazil) |
|---|---|---|
| Operating systems | windows(2.445) ubuntu(209) redhat(189) linux(137) unix(92) longhorn(23) slackware(20) debian(17) suse(13) gentoo(10) fedora(10) opensuse(4) | windows(1,783) debian-br(1,700) ubuntu(721) linux(151) redhat(91) fedora(39) unix(13) opensuse(11) mandrivalinux(10) suse(10) gentoo(7) mandrake(5) slackware(5) |

TABLE 4A-continued

Example key phrase list

| | Asia (China) | S. America (Brazil) |
|---|---|---|
| Browsers | MSIE(2,694) mozilla(417) opera(48) netscape(29) maxthon(14) | mozilla(1,354) MSIE(1,061) opera(54) netscape(49) enigma(17) maxthon(3) |
| Malicious activity | spam(2,392) net-abuse(2,087) malware(883) dnsbl(253) googlebot(100) blacklist(92) worm(30) virus(29) trojan(21) spyware(17) hijack(5) quakeabuse(4) stormworm(4) banlist(4) | spam(5,532) net-abuse(1,514) blacklist(1,152) blocklist(443) virus(272) dnsbl(239) malware(210) bots(90) googlebot(48) trojan(35) quakeabuse(34) banlist(28) spyware(12) worm(10) hijack(8) stormworm(10) |
| P2P | ppstream(12,818) torrent(4,441) Foxy(2,612), gnutella(884) announce(547) tracker(388) p2psky(160) bitcomet(39) | gnutella(1,560) gnucdna(923) morph500(850) LimeWire(636) |

TABLE 4A-continued

Example key phrase list

| | Asia (China) | S. America (Brazil) |
|---|---|---|
| | edonkey2000(24) eMule(18) ed2k(16) xunlei(14) LimeWire(7) tvants(5) morph500(3) gnucdna(3) Ares(3) Pplive(2) | torrent(476) tracker(96) ppstream(50) announce(49) Ares(47) emule(16) p2psky(8) ed2k(4) Foxy(3) bitcomet(3) |
| Protocols & services | ftp(10,725) webmail(937) dns(692) email(462) proxy(347) mms(156) smtp(72) mysql(6) pop3(2) netbios(1) | ftp(3,383) webmail(2,638) proxy(1,023) dns(542) email(527) smtp(145) mysql(79) pop3(13) mms(9) netbios(2) |
| Instant messaging | qq(938) yahoo(700) msn(106) usenet(68) oicq(67) irc(31) icq(25) skype(4) | msn(1,233) yahoo(989) usenet(240) icq(170) qq(126) aol(111) irc(93) skype(1) |
| Gaming | counter-strike(37) quake(36) mmorpg(30) starcraft(21) poker(14) warcraft(6) sims(4) | sims(261) poker(145) counter-strike(144) mmorpg(30) warcraft(19) quake(9) world_of_warcraft(8) halo(4) starcraft(2) |
| Browsing | google(47,584) bbs(32,134) blog(4,282) baidu(3,009) board(2,298) yahoo(700) youtube(356) forums(278) wikipedia(170) rapidshare(6) httpshare(4) | google(61,495) wikipedia(8,245) board(3,239) bbs(1,787) forum(1,436) blog(996) yahoo(989) orkut(564) youtube(370) baidu(76) |

TABLE 4A-continued

Example key phrase list

| Asia (China) | S. America (Brazil) |
|---|---|
| | brturbo(71) rapidshare(20) httpshare(8) |

TABLE 4B

Example key phrase list

| | N. America (US) | Europe (France) |
|---|---|---|
| Operating systems | windows(659) redhat(310) linux(144) opensuse(100) ubuntu(72) debian(34) suse(20) unix(13) fedora(12) gentoo(10) slackware(2) mandrake(2) | debian(1,206) windows(805) ubuntu(570) linux(556) redhat(263) opensuse(105) mandrivalinux(78) uuix(76) mandrake(60) suse(50) fedora-fr(26) gentoo(19) knoppix-fr(10) slackware(1) |
| Browsers | MSIE(495) nozilla(451) netscape(72) opera(20) | mozilla(515) MSIE(320) netscape(75) opera(29) enigma(8) maxthon(1) |
| Malicious activity | spam(2,240) bots(259) blacklist(129) googlebot(113) malware(112) dnsbl(89) net-abuse(85) spyware(54) virus(52) hijack(32) adservers(24) worm(20) stormworm(12) trojan(7) banlist(5) quakeabuse(4) | spam(7,672) net-abuse(314) quakeabuse(182) malware(120) banlist(116) blacklist(98) googlebot(98) dnsbl(50) virus(50) bots(35) adservers(16) spyware(15) stormworm(9) trojan(7) hijack(5) worm(5) |
| P2P | LimeWire(311) gnutella(274) gnucdna(234) morph500(227) torrent(104) tracker(53) announce(19) Ares(8) p2psky(4) WinMX(2) emule(1) ed2k(1) | torrent(2,125) emule(689) gnutella(317) announce(283) gnucDNA(231) tracker(224) morph500(223) ppstream(153) LimeWire(116) p2psky(68) Foxy(59) ed2k(33) bitcomet(19) edonkey2000(11) Ares(4) |
| Protocols & services | ftp(1,868) dns(386) webmail(326) proxy(302) email(144) smtp(81) mms(23) pop3(13) netbios(2) mysql(1) | ftp(12,417) webmail(7,044) proxy(442) smtp(161) dns(149) email(131) mysql(66) mms(33) netbios(20) pop3(13) |
| Instant messaging | yahoo(240) aol(115) msn(61) usenet(32) irc(30) icq(8) messenger(8) skype(6) | yahoo(383) usenet(314) irc(185) aol(89) msn(70) qq(19) gaim(18) icq(18) skype(12) |
| Gaming | worldofwarcraft(32) poker(14) halo(5) quake(4) sims(2) cstrike(1) | counter-strike(49) quake(43) poker(26) sims(23) warcraft(7) mmorpg(7) world_of_warcraft(5) halo(5) starcraft(2) |
| Browsing | google(2,874) wikipedia(1,819) forums(1,139) bbs(522) board(298) blog(287) yahoo(240) youtube(44) rapidshare(1) | google(20,454) wikipedia(6,637) forum(6,609) blog(728) bbs(709) board(533) yahoo(383) youtube(124) baidu(57) skyrock(12) rapidshare(4) |

Although the method of Internet endpoint profiling described above does not require network traffic traces, available network traces allow other classification methods requiring network traces to be compared to the method of the present invention. A graphlet based approach for classifying network traffic known as "BLINC" to those skilled in the art is described iri T. Karagiannis et al., "Multilevel Traffic Classification in the Dark," ACM SIGCOMM, 2005. TABLE 5 shows exemplary comparison for the South American region comparing profiling results using the method of the present invention against that of BLINC based on available network traces. In TABLE 5, URL classes are listed in the leftmost column using notations described in the bottom row of TABLE 5. Profiling results based on the entire network trace is listed under the heading "Pkt. trace". Profiling results based on the one percent sampled entire network trace is listed under the heading "1:100 Sampled trace". In each case, total number of endpoints classified in each URL classes is listed under the heading "Tot." and is further broken down into three categories listed under the headings "B∩U", "B-U", and "U-B". The notation "B∩U" represents endpoints classified by both BLINC and the method of the present invention. The notation "B-U" represents endpoints classified by BLIC but not by the method of the present invention. The notation "U-B" represents endpoints classified by the method of the present invention but not by BLNC.

TABLE 6

Example server tags

| Server tag | Traffic class, User behavior |
|---|---|
| website | Browsing |
| mail server | Mail |
| \<game name\> server | Gaming |
| \<protocol name\> chat server | Chat |
| IRC server | Chat |
| [streaming node] | Streaming |
| \<issue name\> affected host | Maiware |
| p2p node | P2P |
| ftp server | Ftp |

TABLE 5

Example profiling results

| | | Pkt. trace | | | 1:100 Sampled trace | | |
|---|---|---|---|---|---|---|---|
| Cls.' | Tot. | B∩U % | B-U % | U-B % | Tot. | B∩U % | B-U % | U-B % |
| C | 1769 | 16 | 7 | 77 | 484 | 8 | 1 | 91 |
| Br | 9950 | 31 | 10 | 59 | 4964 | .4 | 0 | 99.6 |
| P | 8842 | 14 | 8 | 78 | 1346 | .8 | .2 | 99 |
| G | 22 | 95 | 0 | 5 | 22 | 0 | 0 | 100 |
| S | 160 | 0 | 0 | 100 | 81 | 0 | 0 | 100 |
| M | 3086 | 0 | 0 | 100 | 1179 | 0 | 0 | 100 |
| F | 197 | 0 | 0 | 100 | 52 | 0 | 0 | 100 |

Br browsing, C chat, M mail, P p2p, S streaming, G gaming, F ftp, B BLINC, U Unconstrained Endpoint Profiling Furthermore, although the method of Internet endpoint profiling described above does not require network traffic traces, the method can be applied to classify network traffic traces for a pre-determined region, for example Asia, South America, etc. First, top-ranked IP addresses determined based on a pre-determined criteria (e.g., top 5% of IP address ranked by traffic flow distribution of the Internet such as associated traffic flows of the South American region) are tagged using the method described above to generate a collection of IP tags. Based on a study using available network traffic traces in South American region, it is discovered that the majority of all IP network traffic relates to top 5% of IP addresses. Next, a set of IP tags is selected or otherwise identified from the collection of IP tags based on semantics. For example a set of server tags can be identified by considering IP tags from the collection relating to server activities. Exemplary server tags are shown in the left column in TABLE 6. This concentrated distribution in the empirical statistics is then used to effectively classifying traffic flows based on this relatively small number of server tags. For example, two endpoints (i.e., source endpoint and destination endpoint) for each traffic flow trace to be classified are tagged and compared with the server tags. The traffic flow trace can be classified if either of the two endpoints, when tagged, matches any of the server tags. Due to the concentrated distribution of the empirical statistics, in majority of cases the traffic flow trace can be classified based on semantics according to a server tag matching the tag of either of the two endpoints. TABLE 6 shows exemplary server tags and corresponding traffic classifications (shown in the right column in TABLE 6). For example, if an endpoint of the traffic flow trace is identified as being tagged with "website", the traffic flow trace is classified as "Browsing".

It will be understood from the foregoing description that various modifications and changes may be made in the preferred and alternative embodiments of the present invention without departing from its true spirit. For example, although the examples given above relates to a TCP/IP or an OSI network data model and Google™ search engine, the invention may be applied to other network data model and/or Internet search engines known to one skilled in the art. Furthermore, the scope of the hit text may be supplemented by variations of the examples described or include subset or superset of the examples given above, the method may be performed in a different sequence, the components provided may be integrated or separate, the devices included herein may be manually and/or automatically activated to perform the desired operation. The activation (e.g., applying the seed set, generating the profiling rule, inputting the IP address of the endpoint, classifying the endpoint, etc.) may be performed as desired and/or based on data generated, conditions detected and/or analysis of results from the network traffic.

Figure 4:
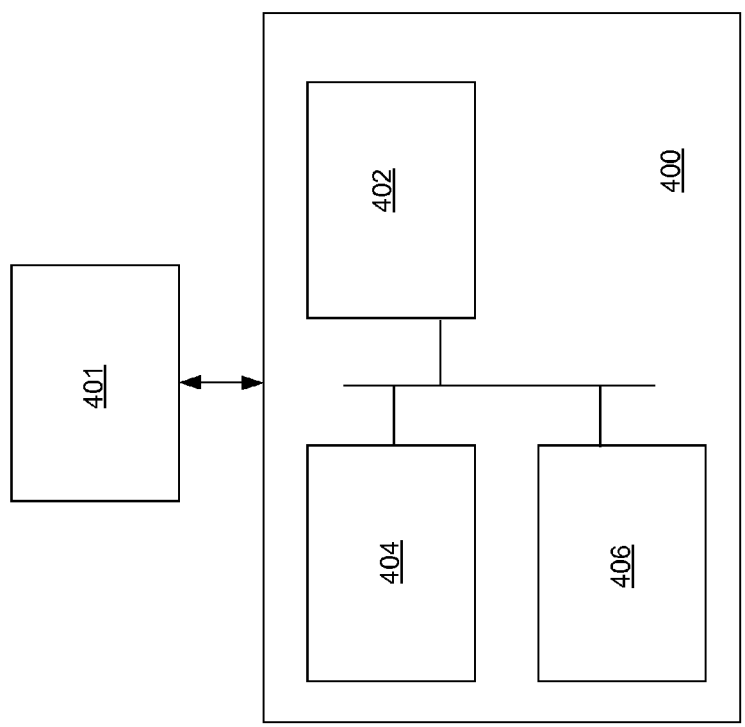
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results such as the feature vectors, the principal components, the application space, the signatures, etc. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of profiling an Internet endpoint associated with an Internet endpoint domain name, comprising:
generating, by a processor of a computer system, a profiling rule using an Internet search engine;
obtaining a search result by inputting the Internet endpoint domain name as a search phrase to the Internet search engine; and
classifying, by the processor, the Internet endpoint based on the search result using the profiling rule,
wherein the profiling rule comprises a IP tag and a key phrase list having a phrase associated with a URL class, the URL class being associated with the IP tag,
wherein the profiling rule further comprises a data structure having an entry, the entry having a first domain name associated with the phrase,
wherein the data structure is a cache having a plurality of indexes corresponding to a plurality of values, the plurality of indexes comprising the first domain name, the plurality of values comprising the phrase,
wherein the search result comprises:
a Uniform Resource Locator (URL) having a second domain name; and
a hit text associated with the URL, the hit text comprising the phrase in the key phrase list,
wherein classifying the Internet endpoint comprises:
assigning the URL class to the URL and assigning the IP tag to the Internet end point in determining the first domain name is the same as the second domain name,
wherein generating the profiling rule comprises:
adding an index comprising the second domain name to the cache in determining the plurality of indexes do not comprise the second domain name;
setting a counter to an initial count;
obtaining another search result by inputting another Internet endpoint domain name to the Internet search engine, the another search result comprising another hit text associated with another URL; the another hit text comprising another phrase in the key phrase list;
incrementing the counter in determining the another URL comprises the second domain name; and setting a value in the cache corresponding to the index based on at least one selected from a group consisting of the phrase and the another phrase in determining the counter exceeds a pre-determined threshold.

2. The method of claim 1, wherein generating the profiling rule further comprises:
obtaining a seed search result by inputting a seed set to the Internet search engine, the seed set comprising a plurality of randomly chosen Internet endpoint identifiers, the seed search result comprising a plurality of hit texts and another Uniform Resource Locator (URL) associated with another hit text of the plurality of hit texts, the plurality of hit texts comprising a plurality of phrases, the another hit text comprising another phrase of the plurality of phrases, the Internet endpoint identifiers comprising at least one selected from a group consisting of an Internet Protocol (IP) address, a domain name, and an IP prefix;
ranking the plurality of phrases to generate a rank of the another phrase based a count of the another phrase in the plurality of hit texts;
adding the another phrase to a key phrase list if the count exceeds another pre-determined threshold;
assigning another URL class to the another URL if the another phrase is added to the key phrase list, the another URL class being determined from the another phrase based on semantics;
determining another IP tag associated with the another URL class, the another IP tag being determined from the another URL class and the another phrase based on semantics; and
associating the another phrase with the another URL class in the profiling rule.

3. The method of claim 2, wherein the hit text comprises content of a webpage referenced by the URL.

4. The method of claim 1, wherein the Internet search engine comprises functionality for:
collecting a snapshot of a plurality of web-pages in at least a portion of Internet;
generating a reverse-index based on the snapshot, the reverse-index being a mapping of phrases to web-pages having the phrases therein; and
resolving a search query using the reverse-index to generate the search result, the search query comprising at least one selected from a group consisting of the search phrase and two or more search phrases combined via one or more logical operators.

5. The method of claim 1,
wherein classifying the Internet endpoint comprises:
assigning the URL class to the URL and assigning the IP tag to the Internet end point if the URL domain name comprises the phrase.

6. The method of claim 1, further comprising:
identifying a plurality of top ranked endpoints from at least a portion of the Internet based on traffic flow distribution associated with at least the portion of the Internet;
classifying the plurality of top ranked endpoints using the profiling rule to generate a plurality of IP tags;
identifying a plurality of server tags from the plurality of IP tags based on semantics; and
classifying a traffic flow having a source IP address and a destination IP address according to the plurality of server tags based on semantics, wherein an IP tag of at least one selected from a group consisting of the source IP address and the destination IP address matches at least one of the plurality of IP tags.

7. The method of claim 1, further comprising:
collecting a snapshot of a plurality of web-pages in at least a portion of Internet;
generating a reverse-index based on the snapshot, the reverse-index being a mapping of phrases to web-pages having the phrases therein;
resolving, by the Internet search engine, a search query using the reverse-index to generate a profiling rule search result, the search query comprising at least one selected from a group consisting of a search phrase and two or more search phrases combined via one or more logical operators; and
generating the profiling rule based on at least one selected from a group consisting of the snapshot, the reverse-index, the search query, and the profiling rule search result.

8. The method of claim 1, further comprising:
identifying the Internet endpoint domain name by performing a reverse domain name service (DNS) query using an IP address associated with the Internet end point.

9. A non-transitory computer readable medium, embodying instructions executable by a computer to perform method steps for profiling an Internet endpoint associated with an Internet Protocol (IP) prefix, the instructions, when executed, comprising functionality for:
generating a profiling rule using an Internet search engine;
obtaining a search result by inputting the IP prefix to the Internet search engine; and
classifying the Internet endpoint based on the search result using the profiling rule,
wherein the profiling rule comprises a IP tag and a key phrase list having a phrase associated with a URL class, the URL class being associated with the IP tag,
wherein the profiling rule further comprises a data structure having an entry, the entry having a first domain name associated with the phrase,
wherein the data structure is a cache having a plurality of indexes corresponding to a plurality of values, the plurality of indexes comprising the first domain name, the plurality of values comprising the phrase,
wherein the search result comprises:
a Uniform Resource Locator (URL) having a second domain name; and
a hit text associated with the URL, the hit text comprising a phrase in the key phrase list,
wherein classifying the Internet endpoint comprises:
assigning the URL class to the URL and assigning the IP tag to the Internet end point if the first domain name is the same as the second domain name,
wherein generating the profiling rule comprises:
adding an index comprising the second domain name to the cache if the plurality of indexes do not comprise the second domain name;
setting a counter to an initial count;
obtaining another search result by inputting another Internet endpoint domain name to the Internet search engine, the another search result comprising another hit text associated with another URL; the another hit text comprising another phrase in the key phrase list;
incrementing the counter if the another URL comprises the second domain name; and
setting a value in the cache corresponding to the index based on at least one selected from the group consisting of the phrase and the another phrase if the counter exceeds a pre-determined threshold.

10. A non-transitory computer readable medium, embodying instructions executable by a computer to perform method

19 steps for profiling an Internet endpoint associated with an Internet Protocol (IP) prefix, the instructions, when executed, comprising functionality for:
  generating a profiling rule using an Internet search engine;
  obtaining a search result by inputting the IP prefix to the Internet search engine; and
  classifying the Internet endpoint based on the search result using the profiling rule,
  wherein the profiling rule comprises a IP tag and a key phrase list having a phrase associated with a URL class, the URL class being associated with the IP tag,
  wherein the profiling rule further comprises a data structure having an entry, the entry having a first domain name associated with the phrase,
  wherein the data structure is a cache having a plurality of indexes corresponding to a plurality of values, the plurality of indexes comprising the first domain name, the plurality of values comprising the phrase,
  wherein the search result comprises:
    a Uniform Resource Locator (URL) having a second domain name; and
    a hit text associated with the URL, the hit text comprising the phrase in the key phrase list,
  wherein classifying the Internet endpoint comprises:
    assigning the URL class to the URL and assigning the IP tag to the Internet end point in determining the first domain name is the same as the second domain name,
  wherein generating the profiling rule comprises:
    adding an index comprising the second domain name to the cache in determining the plurality of indexes do not comprise the second domain name;
    setting a counter to an initial count;
    obtaining another search result by inputting another Internet endpoint domain name to the Internet search engine, the another search result comprising another hit text associated with another URL; the another hit text comprising another phrase in the key phrase list;
    incrementing the counter in determining the another URL comprises the second domain name; and
    setting a value in the cache corresponding to the index based on at least one selected from a group consisting of the phrase and the another phrase in determining the counter exceeds a pre-determined threshold.

11. The non-transitory computer readable medium of claim 10, wherein the hit text comprises content of a webpage referenced by the URL.

12. The non-transitory computer readable medium of claim 9, wherein the Internet search engine comprises functionality for:
  collecting a snapshot of a plurality of web-pages in at least a portion of Internet;
  generating a reverse-index based on the snapshot, the reverse-index being a mapping of phrases to web-pages having the phrases therein; and
  resolving a search query using the reverse-index to generate the search result, the search query comprising at least one selected from a group consisting of the search phrase and two or more search phrases combined via one or more logical operators.

13. The non-transitory computer readable medium of claim 9,
  wherein the instructions, when executed, further comprise functionality for:
    assigning the URL class to the URL and assigning the IP tag to the Internet end point if the URL domain name comprises the phrase.

20

14. The non-transitory computer readable medium of claim 9, the instructions, when executed, further comprising functionality for:
  identifying the IP prefix using an IP address associated with the Internet end point based on a pre-determined criterion.

15. A system for profiling an Internet endpoint associated with an Internet endpoint identifier, comprising:
  a hardware processor;
  a profiling rule generator executing on the hardware processor to generate a profiling rule using an Internet search engine; and
  a profiler operatively coupled to the profiling rule generator, executing on the hardware processor to:
    obtain a search result by inputting the Internet endpoint identifier as a search phrase to the Internet search engine; and
    classify the Internet endpoint based on the search result using the profiling rule,
  wherein the Internet endpoint identifier comprises at least one selected from a group consisting of an Internet Protocol (IP) address, a domain name, and an IP prefix,
  wherein the profiling rule comprises a IP tag and a key phrase list having a phrase associated with a URL class, the URL class being associated with the IP tag,
  wherein the profiling rule further comprises a data structure having an entry, the entry having a first domain name associated with the phrase,
  wherein the data structure is a cache having a plurality of indexes corresponding to a plurality of values, the plurality of indexes comprising the first domain name, the plurality of values comprising the phrase,
  wherein the search result comprises:
    a Uniform Resource Locator (URL) having a second domain name; and
    a hit text associated with the URL, the hit text comprising the phrase in the key phrase list,
  wherein classifying the Internet endpoint comprises:
    assigning the URL class to the URL and assigning the IP tag to the Internet end point in determining the first domain name is the same as the second domain name,
  wherein generating the profiling rule comprises:
    adding an index comprising the second domain name to the cache in determining the plurality of indexes do not comprise the second domain name;
    setting a counter to an initial count;
    obtaining another search result by inputting another Internet endpoint domain name to the Internet search engine, the another search result comprising another hit text associated with another URL; the another hit text comprising another phrase in the key phrase list;
    incrementing the counter in determining the another URL comprises the second domain name; and
    setting a value in the cache corresponding to the index based on at least one selected from a group consisting of the phrase and the another phrase in determining the counter exceeds a pre-determined threshold.

16. The system of claim 15, wherein generating the profiling rule comprises:
  obtaining a seed search result by inputting a seed set to the Internet search engine, the seed set comprising a plurality of randomly chosen Internet endpoint identifiers, the seed search result comprising a plurality of hit texts and another Uniform Resource Locator (URL) associated with another hit text of the plurality of hit texts, the plurality of hit texts comprising a plurality of phrases, the another hit text comprising another phrase of the plurality of phrases;

ranking the plurality of phrases to generate a rank of the another phrase based a count of the another phrase in the plurality of hit texts;

adding the another phrase to a key phrase list if the count exceeds another pre-determined threshold;

assigning another URL class to the another URL if the another phrase is added to the key phrase list, the another URL class being determined from the another phrase based on semantics;

determining another IP tag associated with the another URL class, the another IP tag being determined from the another URL class and the another phrase based on semantics; and associating the another phrase with the another URL class in the profiling rule.

17. The system of claim 16, wherein the hit text comprises content of a webpage referenced by the URL.

18. The system of claim 15, wherein the Internet search engine is to:

collect a snapshot of a plurality of web-pages in at least a portion of Internet;

generate a reverse-index based on the snapshot, the reverse-index being a mapping of phrases to web-pages having the phrases therein; and resolve a search query using the reverse-index to generate the search result, the search query comprising at least one selected from a group consisting of the search phrase and two or more search phrases combined via one or more logical operators.

19. The system of claim 15,
wherein classifying the Internet endpoint comprises:
assigning the URL class to the URL and assigning the IP tag to the Internet end point if the URL domain name comprises the phrase.

20. The system of claim 15, wherein the profiling rule generator is further to:

identify a plurality of top ranked endpoints from at least a portion of the Internet based on traffic flow distribution associated with at least the portion of the Internet;

classify the plurality of top ranked endpoints using the profiling rule to generate a plurality of IP tags;

identify a plurality of server tags from the plurality of IP tags based on semantics; and classify a traffic flow having a source IP address and a destination IP address according to the plurality of server tags based on semantics, wherein an IP tag of at least one selected from a group consisting of the source IP address and the destination IP address matches at least one of the plurality of IP tags.

21. The system of claim 15,
wherein the Internet search engine is to:
collect a snapshot of a plurality of web-pages in at least a portion of Internet;

generate a reverse-index based on the snapshot, the reverse-index being a mapping of phrases to web-pages having the phrases therein; and resolve a search query using the reverse-index to generate a profiling rule search result, the search query comprising at least one selected from a group consisting of a search phrase and two or more search phrases combined via one or more logical operators, and wherein the profiling rule generator further is further to:
generate the profiling rule based on at least one selected from a group consisting of the snapshot, the reverse-index, the search query, and the profiling rule search result.

22. The system of claim 15,
wherein the Internet endpoint identifier comprises an IP address of the Internet endpoint.

23. The system of claim 15,
wherein the Internet endpoint identifier comprises a domain name of the Internet endpoint, and
wherein the profiler is further to:
identify the Internet endpoint domain name by performing a reverse domain name service (DNS) query using an IP address of the Internet end point.

24. The system of claim 15,
wherein the Internet endpoint identifier comprises an IP prefix of the Internet endpoint, and
wherein the profiler is further to:
identify the IP prefix using an IP address associated with the Internet end point based on a pre-determined criterion.

* * * * *